(12) United States Patent
Minami

(10) Patent No.: US 6,919,297 B2
(45) Date of Patent: Jul. 19, 2005

(54) HEAT-SENSITIVE RECORDING MATERIAL

(75) Inventor: Kazumori Minami, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 135 days.

(21) Appl. No.: 10/270,725

(22) Filed: Oct. 16, 2002

(65) Prior Publication Data

US 2003/0118851 A1 Jun. 26, 2003

(30) Foreign Application Priority Data

Oct. 16, 2001 (JP) .......................................... 2001-317837

(51) Int. Cl.⁷ ............................................... B41M 5/40
(52) U.S. Cl. ...................... 503/200; 503/209; 503/217; 503/226
(58) Field of Search ................... 503/200, 209, 503/217, 226

(56) References Cited

U.S. PATENT DOCUMENTS 6,197,724 B1 * 3/2001 Aono .......................... 503/209

FOREIGN PATENT DOCUMENTS

| JP | 7-276808 | 10/1995 |
|---|---|---|
| JP | 9-1928 | 1/1997 |
| JP | 11-291629 | 10/1999 |
| JP | 2002-264500 | 9/2002 |
| JP | 2002-264507 | 9/2002 |
| JP | 2002-264523 | 9/2002 |
| JP | 2002-264524 | 9/2002 |

* cited by examiner

Primary Examiner—Bruce H. Hess
(74) Attorney, Agent, or Firm—Sughrue Mion, PLLC

(57) ABSTRACT

A heat-sensitive recording material including at least a heat-sensitive recording layer, a light transmittance adjusting layer and a heat resistant protective layer on a support, wherein oxygen permeability of the light transmittance adjusting layer is 0.8 or less, and the light transmittance adjusting layer includes a polyvinyl alcohol having a saponification rate of 90 mol % or more.

10 Claims, No Drawings

HEAT-SENSITIVE RECORDING MATERIAL

BACKGROUND OF THE INVENTION

1. Field of the Invention

The present invention relates to a heat-sensitive recording material having light resistance.

2. Description of the Related Art

Heat-sensitive recording has been recently developed because a recording device thereof is simple, reliability is high, and maintenance is unnecessary. As heat-sensitive recording materials, those utilizing a reaction of a diazonium salt compound with a coupler, those utilizing a reaction of an electron-donating colorless dye, an electron-accepting compound, and the like have been conventionally and widely known.

However, in case of heat-sensitive recording materials using a diazonium salt compound or an electron-donating colorless dye, texture is colored by a photo oxidation article which is generated by coexistence of oxygen during light irradiation, and it is one of factors of lowering quality. Accordingly, it has been investigated to reduce the coloring by imparting an undercoat layer for intercepting oxygen and by introducing the precursor layer of an ultraviolet absorbent, but its effect was not adequate.

SUMMARY OF THE INVENTION

The present invention was achieved considering the above-mentioned problems, and the object of the present invention is to provide a heat-sensitive recording material which is remarkably excellent in light resistance while keeping brilliance and can effectively suppress the coloration by exposing texture to light.

The above-mentioned subject is solved by providing the heat-sensitive recording material described below.

A first aspect of the present invention is a heat-sensitive recording material comprising a support having disposed thereon at least a heat-sensitive recording layer, a light transmittance adjusting layer and a heat resistant protective layer, wherein oxygen permeability of the light transmittance adjusting layer is 0.8 or less.

A second aspect of the present invention is the heat-sensitive recording material according to the first aspect, wherein the light transmittance adjusting layer includes at least one selected from the group consisting of a polyvinyl alcohol, a modified polyvinyl alcohol, a styrene-maleic anhydride copolymer, a butadiene-maleic anhydride copolymer, an ethylene-maleic anhydride copolymer, an isobutylene-maleic anhydride copolymer, a polyacryl amide, a poly(styrene sulfonic acid), a polyvinyl pyrrolidone, an ethylene-acrylic acid copolymer, gelatin, a carboxymethyl cellulose, a styrene-butadiene copolymer latex emulsion, a carboxy modified styrene-butadiene copolymer latex emulsion, an acrylonitrile-butadiene copolymer latex emulsion, a mica and pigments.

A third aspect of the present invention is the heat-sensitive recording material comprising a support having disposed thereon at least a heat-sensitive recording layer, a light transmittance adjusting layer and a heat resistant protective layer, wherein the light transmittance adjusting layer includes a polyvinyl alcohol having a saponification rate of 90 mol % or more.

A fourth aspect of the present invention is the heat-sensitive recording material according to the third aspect, wherein oxygen permeability of the light transmittance adjusting layer is 0.8 or less.

A fifth aspect of the present invention is the heat-sensitive recording material according to the third aspect, wherein a content of the polyvinyl alcohol having a saponification rate of 90 mol % or more is 10% by mass or more of the light transmittance adjusting layer.

A sixth aspect of the present invention is the heat-sensitive recording material according to the first aspect, wherein the light transmittance adjusting layer includes a polyvinyl alcohol represented by the following general formula (1):

General formula (1)

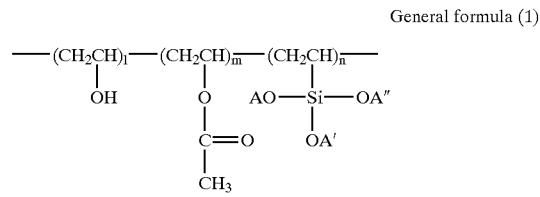

wherein 1, m and n represent a polymerization molar ratio, 1 represents a real number from 90 to 99, m represents a real number from 0 to 10 and n represents a real number from 0 to 10 and A, A' and A" each represent a $C_1$ to $C_8$ alkyl group.

A seventh aspect of the present invention is the heat-sensitive recording material according to the third aspect, wherein the light transmittance adjusting layer includes a polyvinyl alcohol represented by the following general formula (1):

General formula (1)

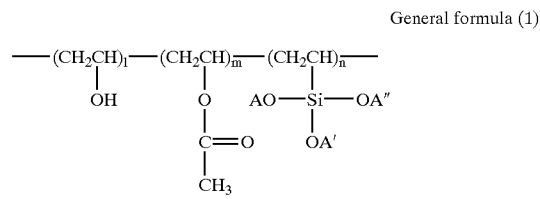

wherein 1, m and n represent a polymerization molar ratio, 1 represents a real number from 90 to 99, m represents a real number from 0 to 10 and n represents a real number from 0 to 10 and A, A' and A" each represent a $C_1$ to $C_8$ alkyl group.

An eighth aspect of the present invention is the heat-sensitive recording material according to the first aspect, wherein the light transmittance adjusting layer includes a component that functions as a precursor of an ultraviolet absorbent.

A ninth aspect of the present invention is the heat-sensitive recording material according to the third aspect, wherein the light transmittance adjusting layer includes a component that functions as a precursor of an ultraviolet absorbent.

A tenth aspect of the present invention is the heat-sensitive recording material according to the eighth aspect, wherein the component that functions as a precursor of an ultraviolet absorbent is included in the light transmittance adjusting layer by a method selected from the group consisting of solid dispersion, emulsification dispersion, polymer dispersion, latex dispersion and microencapsulation.

An eleventh aspect of the present invention is the heat-sensitive recording material according to the ninth aspect, wherein the component that functions as a precursor of an ultraviolet absorbent is included in the light transmittance adjusting layer by a method selected from the group consisting of solid dispersion, emulsification dispersion, polymer dispersion, latex dispersion, and microencapsulation.

A twelfth aspect of the present invention is the heat-sensitive recording material according to the eighth aspect, wherein the component that functions as a precursor of an ultraviolet absorbent comprises at least one compound selected from compounds represented by one of the following general formulae (2), (3), (4) and (5).

General formula (2)

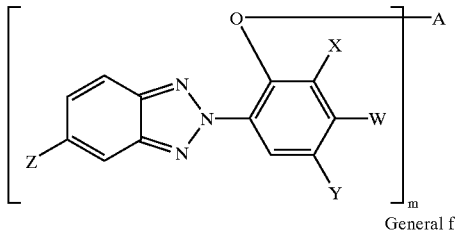

General formula (3)

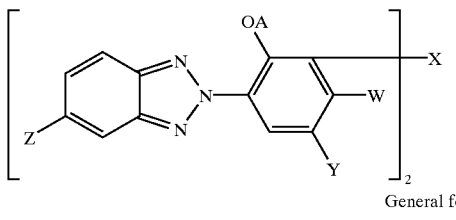

General formula (4)

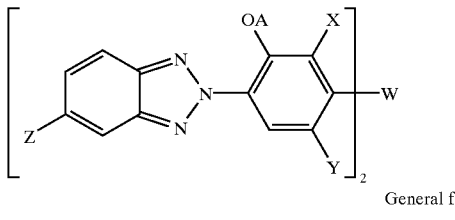

General formula (5)

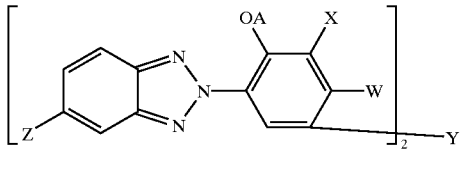

wherein:
in the general formulae (2) to (5), m represents 1 or 2;
in the general formula (2) and the general formulae (3) to (5) when m=1, A represents —SO$_2$—R, —CO—R, —CO$_2$—R, —CONH—R, —POR$^1$R$^2$, —CH$_2$R$^3$ or —SiR$^4$R$^5$R$^6$.
in the general formula (2), when m=2, A represents —SO$_2$—R$^7$—SO$_2$—, —CO—, —COCO—, —COR$^7$CO—, —SO$_2$— or —SO—;
in the general formulae (2), (4) and (5), X represents a hydrogen atom, an alkyl group, an alkoxy group, an aryl group or a halogen atom;
in the general formula (3), X represents an alkylene group, —COR$^7$CO— or —COR$^7$CO$_2$—;
in the general formulae (2), (3) and (5), W represents a hydrogen atom, an alkyl group, an alkoxy group, an aryl group or a halogen atom;
in the general formula (4), W represents —COR$^7$CO— or —COR$^7$CO$^2$—;
in the general formulae (2), (3) and (4), Y represents a hydrogen atom, an alkyl group, an alkoxy group, an aryl group or a halogen atom;
in the general formula (5), Y represents —COR$^7$O— or —OCOR$^7$CO$_2$—, —CH$_2$CH$_2$CO$_2$R$^7$OCOCH$_2$CH$_2$—, —CH$_2$CH$_2$OCOR$^7$CO$_2$CH$_2$CH$_2$— or —CH$_2$CH$_2$CON(R$^8$) R$^7$N(R$^8$)COCH$_2$CH$_2$—;
Z represents a hydrogen atom, a halogen atom, an alkyl group or an alkoxy group;

R represents an alkyl group or an aryl group;
R$^1$ and R$^2$ each represent an alkoxy group, an aryloxy group, an alkyl group or an aryl group;
R$^3$ represents a phenyl group which is substituted with at least one of a nitro group or a methoxy group;
R$^4$, R$^5$ and R$^6$ each represent an alkyl group or an aryl group;
R$^7$ represents an alkylene group or an arylene group; and
R$^8$ represents a hydrogen atom or an alkyl group.

A thirteenth aspect of the present invention is the heat-sensitive recording material according to the ninth aspect, wherein the component that functions as a precursor of an ultraviolet absorbent comprising at least one compound selected from compounds represented by one of the following general formulae (2), (3), (4) and (5).

General formula (2)

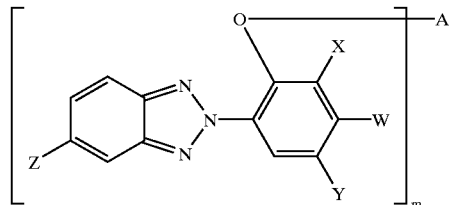

General formula (3)

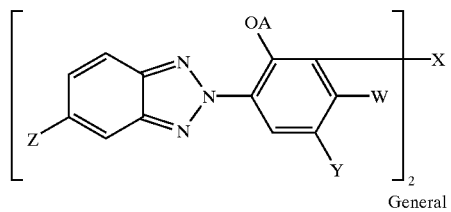

General formula (4)

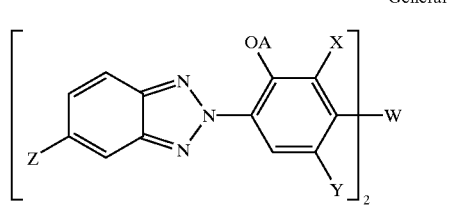

General formula (5)

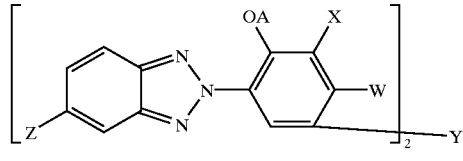

wherein:
in the general formulae (2) to (5), m represents 1 or 2;
in the general formula (2) and the general formulae (3) to (5) when m=1, A represents —SO$_2$—R, —CO—R, —CO$_2$—R, —CONH—R, —POR$^1$R$^2$, —CH$_2$R$^3$ or —SiR$^4$R$^5$R$^6$.
in the general formula (2), when m=2, A represents —SO$_2$—R$^7$— SO$_2$—, —CO—, —COCO—, —COR$^7$CO—, —SO$_2$— or —SO—;
in the general formulae (2), (4) and (5), X represents a hydrogen atom, an alkyl group, an alkoxy group, an aryl group or a halogen atom;
in the general formula (3), X represents an alkylene group, —COR$^7$CO— or —COR$^7$CO$_2$—;
in the general formulae (2), (3) and (5), W represents a hydrogen atom, an alkyl group, an alkoxy group, an aryl group or a halogen atom;

in the general formula (4), W represents —COR⁷CO— or —COR⁷CO₂—;
in the general formulae (2), (3) and (4), Y represents a hydrogen atom, an alkyl group, an alkoxy group, an aryl group or a halogen atom;
in the general formula (5), Y represents —COR⁷O— or —OCOR⁷CO₂—, —CH₂CH₂CO₂R⁷OCOCH₂CH₂—, —CH₂CH₂OCOR⁷CO₂CH₂CH₂— or —CH₂CH₂CON(R⁸)R⁷N(R⁸)COCH₂CH₂—;
Z represents a hydrogen atom, a halogen atom, an alkyl group or an alkoxy group;
R represents an alkyl group or an aryl group;
R¹ and R² each represent an alkoxy group, an aryloxy group, an alkyl group or an aryl group;
R³ represents a phenyl group which is substituted with at least one of a nitro group or a methoxy group;
R⁴, R⁵ and R⁶ each represent an alkyl group or an aryl group;
R⁷ represents an alkylene group or an arylene group; and
R⁸ represents a hydrogen atom or an alkyl group.

A fourteenth aspect of the present invention is the heat-sensitive recording material according to the first aspect, wherein the heat-sensitive recording layer comprises at least one layer including, as main components, a diazonium salt compound, a diazo-base coloring agent containing a coupler which undergoes a coupling reaction with the diazonium salt compound, and a binder.

A fifteenth aspect of the present invention is the heat-sensitive recording material according to the third aspect, wherein the heat-sensitive recording layer comprises at least one layer including, as main components, a diazonium salt compound, a diazo-base coloring agent containing a coupler which undergoes a coupling reaction with the diazonium salt compound, and a binder.

A sixteenth aspect of the present invention is the heat-sensitive recording material according to the first aspect, wherein the heat-sensitive recording layer comprises a compound represented by the following general formula (A) in an amount of 0.05 g/m² or more

    R—SO₃M                General formula (A)

wherein, in the general formula (A), R represents an alkyl group, an aryl group, an alkoxy group, an aryloxy group, a polyoxyethylenearyl group, or a polyoxyethylenealkyl group, and M represents an alkali metal.

A seventeenth aspect of the present invention is the heat-sensitive recording material according to the third aspect, wherein the heat-sensitive recording layer comprises a compound represented by the following general formula (A) in an amount of 0.05 g/m² or more

    R—SO₃M                General formula (A)

wherein, in the general formula (A), R represents an alkyl group, an aryl group, an alkoxy group, an aryloxy group, a polyoxyethylenearyl group, or a polyoxyethylenealkyl group, and M represents an alkali metal.

An eighteenth aspect of the present invention is the heat-sensitive recording material according to the sixteenth aspect, wherein the compound represented by general formula (A) is sodium dodecylbenzenesulfonate.

A nineteenth aspect of the present invention is the heat-sensitive recording material according to the seventeenth aspect, wherein the compound represented by general formula (A) is sodium dodecylbenzenesulfonate.

DESCRIPTION OF THE PREFERRED EMBODIMENTS

The heat-sensitive recording material of the present invention is a heat-sensitive recording material having at least a heat-sensitive recording layer, a light transmittance adjusting layer and a heat resistant protective layer on a support, wherein oxygen permeability of the light transmittance adjusting layer is 0.8 or less, or a polyvinyl alcohol having a saponification rate of 90 mol % or more is contained in the light transmittance adjusting layer.

Further, the light transmittance adjusting layer is provided between the heat-sensitive recording layer and the heat resistant protective layer, but the heat-sensitive recording material of the present invention may have other layer, for example, an undercoat layer which is provided between the support and the heat-sensitive recording layer, an intermediate layer which is provided between the mutual heat-sensitive recording layers, and the like.

The heat-sensitive recording material of the present invention is specifically illustrated below.

Oxygen Permeability

The oxygen permeability means a measurement value, which was carried out at conditions below, the oxygen permeability in the present specification was carried out by the present measurement method.

Firstly, a coating solution for the light transmittance adjusting layer is coated on a substrate so as to be a layer thickness of 1.5 μm and a sample for measurement is prepared. Then, an oxygen electrode (GU-B manufactured by Iijima Electronics Corporation) is installed on the sample prepared, voltage is measured by a Digital Multimeter (manufactured by Advantest Corporation) under conditions of a temperature of 25° C. and a humidity of 50% RH, and the oxygen permeability is measured by the conversion equation below:

$$\text{Oxygen permeability } P = \text{Voltage} \times \text{Film thickness}/4FARPs$$

wherein F represents a Faraday constant, A represents a cathode area, R represents internal resistance, and Ps represents oxygen partial pressure, respectively.

Light Transmittance Adjusting Layer

In the present invention, it is characterized that the oxygen permeability of the light transmittance adjusting layer is 0.8 or less, or a polyvinyl alcohol having a saponification rate of 90 mol % or more is contained in the light transmittance adjusting layer.

As the light transmittance adjusting layer, at least one layer is preferably provided in the heat-sensitive recording layer, and more preferably provided between the heat-sensitive recording layer and the protective layer. Further, the light transmittance adjusting layer may be designed to be used as the protective layer.

As a procedure of lowering the oxygen permeability of the light transmittance adjusting layer, it is effective to add water-soluble polymers such as a polyvinyl alcohol, a modified polyvinyl alcohol, a styrene-maleic anhydride copolymer, a butadiene-maleic anhydride copolymer, an ethylene-maleic anhydride copolymer, an isobutylene-maleic anhydride copolymer, a polyacryl amide, a poly (styrene sulfonic acid), a polyvinyl pyrrolidone, an ethylene-acrylic acid copolymer, gelatin and carboxymethyl cellulose; hydrophobic polymer latex emulsions such as a styrene-butadiene copolymer, a carboxy modified styrene-butadiene copolymer and an acrylonitrile-butadiene copolymer; stratiform compounds having a high aspect ratio such as mica and the like; various pigments and the like, to the light adjusting layer.

In the present invention, it is characterized that a polyvinyl alcohol having a saponification rate of 90 mol % or more is contained in the light transmittance adjusting layer. Specific example of the polyvinyl alcohol having a saponification rate of 90 mol % or more includes PVA 105, PVA 117, PVA 124, PVA 117C, PVA 124C (either of these is manufactured by Kuraray Co., Ltd.); and specific example of the modified polyvinyl alcohol having a saponification rate of 90 mol % or more includes carboxy acid-modified PVA's such as KL 118, KM 118, and KM 618 (either of these is manufactured by Kuraray Co., Ltd.); terminal alkyl-modified PVA's such as MP 103 (manufactured by Kuraray Co., Ltd.); terminal thiol-modified PVA's such as M115 (manufactured by Kuraray Co., Ltd.); and the like. Among these, it is particularly preferable to add silanol-modified PVA's such as R1130, R2105 and R2130 (either of these is manufactured by Kuraray Co., Ltd.).

The oxygen permeability of the light transmittance adjusting layer is remarkably reduced by containing the polyvinyl alcohol having a saponification rate of 90 mol % or more in the light transmittance adjusting layer.

Among these, it is particularly preferable to contain the polyvinyl alcohol represented by the following general formula (1):

General formula (1)

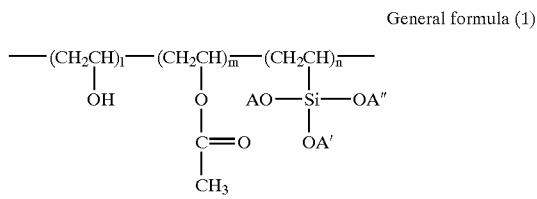

wherein l represents an integer from 90 to 99, m represents an integer from 0 to 10 and n represents an integer from 0 to 10. Above all, l is preferably 95 to 99, m is preferably 0 to 5 and n is preferably 0 to 5, and in particular, l is most preferably 98 to 99, m is most preferably 0 to 1 and n is most preferably 0 to 1.

Further, A, A' and A" each represent a $C_1$ to $C_8$ alkyl group. The alkyl groups of A, A' and A" include a methyl group, an ethyl group, a n-propyl group, an isopropyl group, a n-butyl group, an isobutyl group, a n-pentyl group, an i-pentyl group, a n-hexyl group, an i-hexyl group, a n-heptyl group, an i-heptyl group, a n-octyl group, an i-octyl group, and the like. A, A' and A" may be identical group with each other, and may have a substituent.

When the saponification rate of the polyvinyl alcohol represented by the general formula (1) is 90 mol % or more, the crystallization of the polyvinyl alcohol during film formation is accelerated and the oxygen permeability is remarkably reduced.

Further, it is preferable to contain a component which functions as a precursor of an ultraviolet absorbent, in the light transmittance adjusting layer. The component which functions as a precursor of an ultraviolet absorbent functions as an ultraviolet absorbent by being reacted by light or heat after termination of the irradiation of light having a wave length of a region which is requisite for fixation of the heat-sensitive recording layer by light irradiation. The greater part of the light having a wave length of a region which is requisite for fixation of the ultraviolet region is absorbed by the ultraviolet absorbent, the transmission is lowered, and the light resistance of the heat-sensitive recording material is improved, but the transmission of visible light beam is not substantially changed because there is no absorption effect of the visible light beam.

As the example of the component which functions as a precursor of the ultraviolet absorbent, the compounds represented by any one of the following general formulae (2) to (5) are preferably mentioned.

General formula (2)

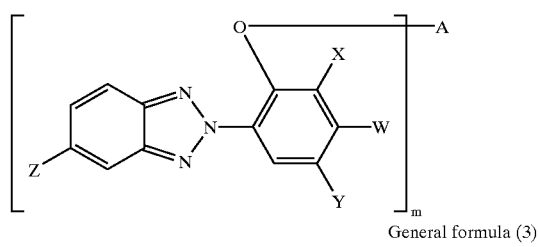

General formula (3)

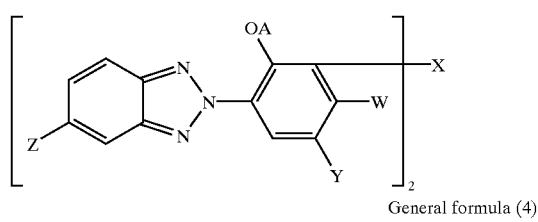

General formula (4)

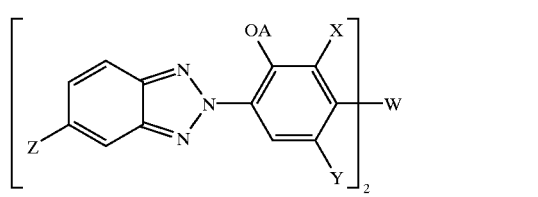

General formula (5)

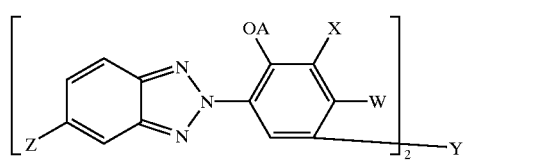

In the general formulae (2) to (5), m represents 1 or 2.

In the general formula (2) and the general formulae (3) to (5) when m=1, A represents —$SO_2$—R, —CO—R, —$CO_2$—R, —CONH—R, —PO$R^1R^2$, —$CH_2R^3$ or —Si$R^4R^5R^6$. Further, in the general formula (2), when m=2, A represents —$SO_2$—$R^7$—$SO_2$—, —CO—, —COCO—, —CO$R^7$CO—, —$SO_2$— or —SO—.

In the general formulae (2), (4) and (5), X represents a hydrogen atom, an alkyl group, an alkoxy group, an aryl group or a halogen atom. Further, in the general formula (3), X represents an alkylene group, —CO$R^7$CO— or —CO$R^7CO_2$—.

In the general formulae (2), (3) and (5), W represents a hydrogen atom, an alkyl group, an alkoxy group, an aryl group or a halogen atom. Further, in the general formula (4), W represents —CO$R^7$CO— or —CO$R^7CO_2$—.

In the general formulae (2), (3) and (4), Y represents a hydrogen atom, an alkyl group, an alkoxy group, an aryl group or a halogen atom. Further, in the general formula (5), Y represents —CO$R^7$O— or —OCO$R^7CO_2$—, —$CH_2CH_2CO_2R^7OCOCH_2CH_2$—, —$CH_2CH_2OCOR^7CO_2CH_2CH_2$— or —$CH_2CH_2CON(R^8)$ $R^7N(R^8)COCH_2CH_2$—.

Z represents a hydrogen atom, a halogen atom, an alkyl group or an alkoxy group.

Here R represents an alkyl group or an aryl group. $R^1$ and $R^2$ each represent an alkoxy group, an aryloxy group, an alkyl group or an aryl group. $R^3$ represents a phenyl group which was substituted with at least one of a nitro group or a methoxy group. $R^4$, $R^5$ and $R^6$ each represent an alkyl group or an aryl group. $R^7$ represents an alkylene group or an arylene group. $R^8$ represents a hydrogen atom or an alkyl group.

The alkyl group may be a linear chain or a branched chain. Further, the alkyl group may have an unsaturated bonding and may be substituted with an alkoxy group, an aryloxy group, an alkoxycarbonyl group, an aryloxycarbonyl group, an aryl group, a hydroxy group, and the like. The aryl group may be substituted with alkyl group, alkoxy group, or halogen atom.

The alkylene group may be a linear chain, a branched chain, and may contain an unsaturated bonding, an oxygen atom, a sulfur atom and a nitrogen atom. Further, the alkylene group may be substituted with an alkoxy group, a hydroxy group, an aryloxy group or an aryl group.

The arylene group may be further substituted with an alkyl group, an alkoxy group, a halogen atom and the like.

As the substituents represented by X, Y and W, an alkyl group having 1 to 18 carbons, an alkoxy group having 1 to 18 carbons, an aryl group having 6 to 18 carbons, a fluorine atom, a chlorine atom, a bromine atom or a hydrogen atom is preferable, and among these, an alkyl group having 1 to 12 carbons, an alkoxy group having 1 to 12 carbons, a phenyl group, or a hydrogen atom or a chlorine atom is particularly preferable.

As the substituent represented by Z, a hydrogen atom, a chlorine atom, a fluorine atom, an alkyl group having 1 to 12 carbons and an alkoxy group having 1 to 12 carbons are preferable, and among these, an alkyl group having 1 to 6 carbons, an alkoxy group having 1 to 6 carbons or a hydrogen atom or a chlorine atom is particularly preferable.

As the substituent represented by R, an alkyl group having 1 to 18 carbons and an aryl group having 6 to 18 carbons are preferable, and among these, an alkyl group having 1 to 12 carbons and an aryl group having 6 to 12 carbons are particularly preferable.

As the substituents represented by $R^1$ and $R^2$, an alkoxy group having 1 to 12 carbons, an aryloxy group having 6 to 12 carbons, an alkyl group having 1 to 12 carbons and an aryl group having 6 to 12 carbons are preferable.

As the substituent represented by $R^3$, a 2-nitrophenyl group, a 3,5-dimethoxyphenyl group and a 3,4,5-trimethoxyphenyl group are preferable.

As the substituents represented by $R^4$, $R^5$ and $R^6$, an alkyl group having 1 to 12 carbons or an aryl group having 6 to 12 carbons is preferable, and an alkyl group having 1 to 8 carbons or a phenyl group is particularly preferable.

In a so-called bis-body which has two benzotriazole rings in a molecule, an alkylene group having 1 to 12 carbons or an arylene group having 6 to 12 carbons is preferable as the substituent represented by $R^7$, and a hydrogen atom or an alkyl group having 1 to 6 carbons is preferable as the substituent represented by $R^8$.

As the substituent represented by A, —$SO_2$—R is particularly preferable.

Specific examples of the substituent are mentioned below, but the present invention is not limited to them.

A monovalent substituent among the substituents represented by X, Y and W includes a hydrogen atom, a methyl group, an ethyl group, a n-propyl group, an isopropyl group, a n-butyl group, an isobutyl group, a sec-butyl group, a tert-butyl group, a pentyl group, a hexyl group, an octyl group, a decyl group, a dodecyl group, an allyl group, a 2-butenyl group, a benzyl group, an α-dimethylbenzyl group, a methoxy group, an ethoxy group, a propoxy group, a butyloxy group, an octyloxy group, a dodecyloxy group, a methoxyethoxy group, a phenoxyethoxy group, a methoxycarbonylethyl group, an ethoxycarbonylethyl group, a propyloxycarbonylethyl group, a butyloxycarbonylethyl group, an octyloxycarbonylethyl group, a phenoxycarbonylethyl group, a phenyl group, a tolyl group, a chlorine atom, a fluorine atom, a bromine atom and the like. As a divalent substituent, those described below are mentioned.

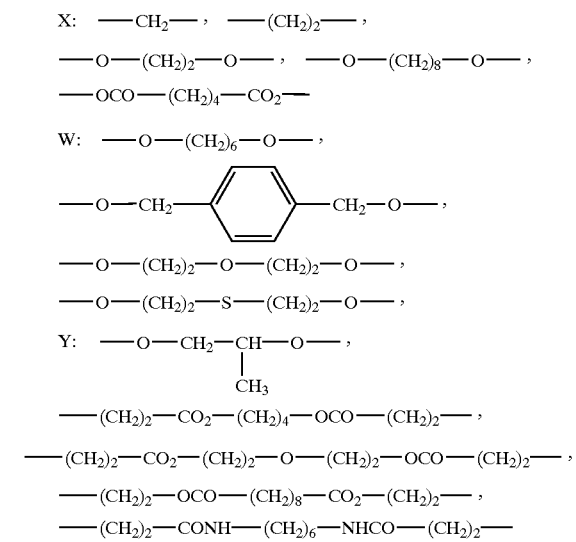

As the substituent represented by Z, a hydrogen atom, a chlorine atom, a methyl group, an ethyl group, a propyl group, a hexyl group, a methoxy group, an ethoxy group, a propoxy group, an octyloxy group and the like are mentioned.

A monovalent substituent among the substituent represented by A includes a methanesulfonyl group, an ethanesulfonyl group, a butanesulfonyl group, a benzenesulfonyl group, a 4-methylbenzenesulfonyl group, a 2-mesitylenesulfonyl group, a 4-methoxybenzenesulfonyl group, a 4-octyloxybenzenesulfonyl group, a 2,4,6-triisopropylbenzenesulfonyl group, a β-styrenesulfonyl group, a vinylbenzenesulfonyl group, a 4-chlorobenzenesulfonyl group, a 2,5-dichlorobenzenesulfonyl group, a 2,4,5-trichlorobenzenesulfonyl group, a 1-naphthalenesulfonyl group, a 2-naphthalenesulfonyl group, a quinolinesulfonyl group, a thiophenesulfonyl group, an acetyl group, a propionyl group, a butyryl group, a pivaloyl group, a lauroyl group, a stearoyl group, a benzoyl group, a cinnamoyl group, a furoyl group, a nicotinoyl group, a methoxycarbonyl group, an ethoxycarbonyl group, a phenoxycarbonyl group, a hexaminocarbonyl group, a phenylaminocarbonyl group, a dipneylphosphoryl group, a diethylphosphoryl group, a 2-nitrobenzyl group, a 3,5-dimethoxybenzyl group, a 3,4,5-trimethoxybenzyl group, a trimethylsilyl group, a triethylsilyl group, a tert-butyldimethylsilyl group, a diethylisopropylsilyl group, a dimethylphenylsilyl group, a diphenylmethylsilyl group, a triphenylsilyl group, and the like, and as a divalent substituent, those described below are mentioned.

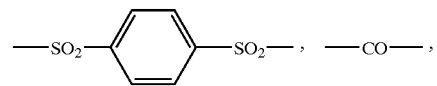

-continued

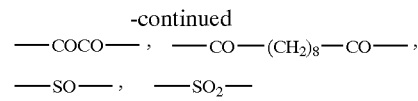

When A is —SiR⁴R⁵R⁶, photo acid-generating agents such as an ammonium salt, a diazonium salt, an iodonium salt, a sulfonium salt, a phosphonium salt and an onium salt may be used in combination. As the specific examples of these photo acid-generating agents, those described in "Organic Materials for Imaging" (edited by Society for Scientific Research of Organic Electronics Materials, 1993) are mentioned.

Compounds represented by the general formulae (2) to (5) can be easily prepared by conventionally known methods, and these may be used alone or two or more may be used in combination.

The mode of compounds represented by the general formulae (2) to (5) in the light transmittance adjusting layer is not particularly limited, and can be appropriately selected in accordance with purposes. For example, (1) a method of containing these by solid dispersion, (2) a method of containing these by emulsification dispersion, (3) a method of containing these by polymer dispersion, (4) a method of containing these by latex dispersion, (5) a method of containing these by microencapsulation, and the like are mentioned. Among these, the method of containing these by emulsification dispersion or the method of containing these by microencapsulation is preferable.

As the method of emulsification dispersion, the compounds represented by the general formulae (2) to (5) are firstly dissolved in oil.

The oil may be solid, liquid or a polymer at a normal temperature, and includes low boiling point auxiliary solvents such as an acetic acid ester, methylene chloride and cyclohexanone, and/or high boiling point oils such as a phosphoric acid ester, a phthalic acid ester, an acrylic acid ester, a methacrylic acid ester, other carboxylic acid esters, a fatty acid amide, an alkylated biphenyl, an alkylated terphenyl, an alkylated naphthalene, diarylethane, chlorinated paraffin, an alcohol-base oil, a phenol-base oil, an ether-base oil, a mono olefin-base oil, an epoxy-base oil, and the like. As specific examples, tricresyl phosphate, trioctyl phosphate, octyldiphenyl phosphate, tricyclohexyl phosphate, dibutyl phthalate, dioctyl phthalate, dilauryl phthalate, dicyclohexyl phthalate, butyl olefinate, diethyleneglycol benzoate, dioctyl sebacate, dibutyl sebacate, dioctyl adipate, trioctyl trimellitate, acetyltriethyl succinate, octyl maleate, dibutyl maleate, isoamyl biphenyl, chlorinated paraffin, diisopropyl naphthalene, 1,1'-ditolylethane, 2,4-ditert-amylphenol, N,N-dibutyl-2-butoxy-5-tert-octyl aniline, 2-ethylhexyl hidroxybenzoate, polyethylene glycol and the like. These may be used alone or may be used in combination. Among these, an alcohol-base, a phosphoric acid ester-base, a carboxylic acid ester-base, an alkylated biphenyl, an alkylated terphenyl, an alkylated naphthalene and diarylethane are preferable.

In the present invention, carbonization preventives such as a hindered phenol and a hindered amine may be added to the oil.

The oil which contains compounds represented by the general formulae (2) to (5) is added to an aqueous solution of a water-soluble polymer, and the mixture is emulsified to be dispersed by a colloid mill, a homogenizer or ultra sonic.

The water-soluble polymer includes a polyvinyl alcohol, a silanol-modified polyvinyl alcohol, a carboxy-modified polyvinyl alcohol, an amino-modified polyvinyl alcohol, an itaconic acid-modified polyvinyl alcohol, a butadiene-maleic anhydride copolymer, a butadiene-maleic anhydride copolymer, an ethylene-maleic anhydride copolymer, an isobutylene-maleic anhydride copolymer, a polyacryl amide, a polystyrenesulfonic acid, a polyvinyl pyrrolidone, an ethylene-acrylic acid copolymer, gelatin and the like. In the present invention, a surfactant and the like may be added to the water-soluble polymer, if necessary, and further, an emulsion or a latex of a hydrophobic polymer may be used in combination.

When the diazonium salt compound or the compound represented by the general formulae (2) to (5) is microencapsulated, conventionally known methods can be used as the microencapsulation method. For example, the diazonium salt compound or the compound represented by the general formulae (2) to (5) can be prepared by dissolving the compound represented by the general formulae (2) to (5) and the precursor of a microcapsule wall in a hardly soluble or non-soluble organic solvent, adding the mixture to the aqueous solution of a water-soluble polymer, emulsifying it to be dispersed using a homogenizer and the like, raising temperature thereof, and forming a wall membrane of a polymer substance which is the microcapsule wall, on the interface of oil/water.

The specific example of the microcapsule wall membrane includes, for example, a wall membrane consisting of a polyurethane resin, a polyurea resin, a polyamide resin, a polyester resin, a polycarbonate resin, an aminoaldehyde resin, a melamine resin, a polystyrene resin, a styrene-acrylate copolymer resin, a styrene-methacrylate copolymer resin, gelatin, a polyvinyl alcohol and the like. Among these, a wall membrane consisting of a polyurethane-polyurea resin.

The microcapsule having the wall membrane consisting of a polyurethane-polyurea resin is produced, for example, by mixing the precursor of a microcapsule wall such as a polyvalent isocyanate in a core substance to which it should be microencapsulated, emulsifying it to be dispersed in the aqueous solution of a water-soluble polymer such as a polyvinyl alcohol, raising the temperature of the solution, and carrying out a polymer formation reaction at an oil drop interface.

The specific example of the polyvalent isocyanate compound includes dissociates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-diphenylmethane-4,4'-diisocyanate, xylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate and cyclohexylene-1,4-diisocyanate; triisocyanates such as 4,4',4"-triphenylmethane triisocyanate and toluene-2,4,6-triisocyanate; tetraisocyanates such as 4,4'-dimethyldiphenylmethane-2, 2',5,5'-tetraisocyanate; isocyanate prepolymers such as an adduct of hexamethylene diisocyanate with trimethylol propane, an adduct of 2,4-tolylene diisocyanate with trimethylol propane, an adduct of xylylene diisocyanate with trimethylol propane, and an adduct of tolylene diisocyanate with hexanetriol; and the like. These may be used alone or may be used in combination, and among these, those having three or more of isocyanate groups in a molecule are particularly preferable.

In the method of microencapsulation, the oil shown in the method of emulsification and dispersion can be used as the organic solvent dissolving the diazonium salt compound or the compound represented by the general formulae (2) to (5). Further, it is similar as in the water-soluble polymer.

As the average particle diameter of the microcapsule, 0.1 to 1.0 μm is preferable, and 0.2 to 0.7 μm is more preferable.

Heat-Sensitive Recording Layer

One layer or a plural number of layers of the heat-sensitive recording layer may be provided in the heat-sensitive recording material of the present invention. When a plural number of layers are provided, it is necessary to use coloring agents that have different energies required for coloring. Further, the heat-sensitive recording material of the present invention may be full color or mono color, but is desirably those having at least one layer of the heat-sensitive recording layer (photo fixation type heat-sensitive recording layer) in which the diazonium salt compound, the diazo-base coloring agent containing a coupler which carries out a coupling reaction with the diazonium salt compound, and a binder on a support, as main components. Further, the coloring agent of the heat-sensitive recording layer may be any one of a leuco-base coloring agent containing an electron-donating dye and an electron-accepting compound, a base coloring system which colors by being contacted with a base compound, a chelate coloring system, a coloring system which colors by reaction with a nucleophilic agent and the like, in addition to the above-mentioned diazo-base coloring agent.

When the heat-sensitive recording layer contains the diazonium salt compound and a coupler which colors at heating by reaction with the diazonium salt compound, the diazonium salt compound, a basic substance which accelerates the coloring reaction with the coupler, and the like are preferably added to the heat-sensitive recording layer.

The diazonium salt compound is a compound represented by the general formula (B) described below, the maximum absorption of these compounds wave length can be controlled by the positions and kinds of the substituent of Ar portion.

$$Ar-N_2^+X^- \quad \text{General formula (B)}$$

In the general formula (B), Ar represents an aryl group. X represents an acid anion.

The specific example of the diazonium salt compound includes salts of acid anion such as 4-(N-(2-(2,4-di-tert-amylphenoxy)butyryl)piprazino)benzenediazonium, 4-dioctylaminobenzenediazonium, 4-(N-(2-ethylhexanoyl)piprazino)benzenediazonium, 4-dihexylamino-2-hexyloxybenzenediazonium, 4-N-ethyl-N-hexadecylamino-2-ethoxybenzodiazonium, 3-chloro-4-dioctylamino-2-octyloxyobenzenediazonium, 2,5-dibutoxy-4-morphorinobenzenediazonium, 2,5-octoxy-4-morphorinobenzenediazonium, 2,5-dibutoxy-4-(N-(2-ethylhexanoyl)piperazino)benzenediazonium, 2,5-diethoxy-4-(N-(2-(2,4-di-tert-amylphenoxy)butyryl)piperazino)benzenediazonium, 2,5-dibutoxy-4-tolylthiobenzenediazonium, 3-(2-octyloxyethoxy)-4-morphorinobenzenediazonium, and the following diazonium salt compounds (D-1 to 5). These may be used alone or may be used in combination.

Among these, a salt of hexafluorophosphoric acid, a salt of tetrafluoroboric acid, and a salt of 1,5-naphthalene sulfonic acid are particularly preferable.

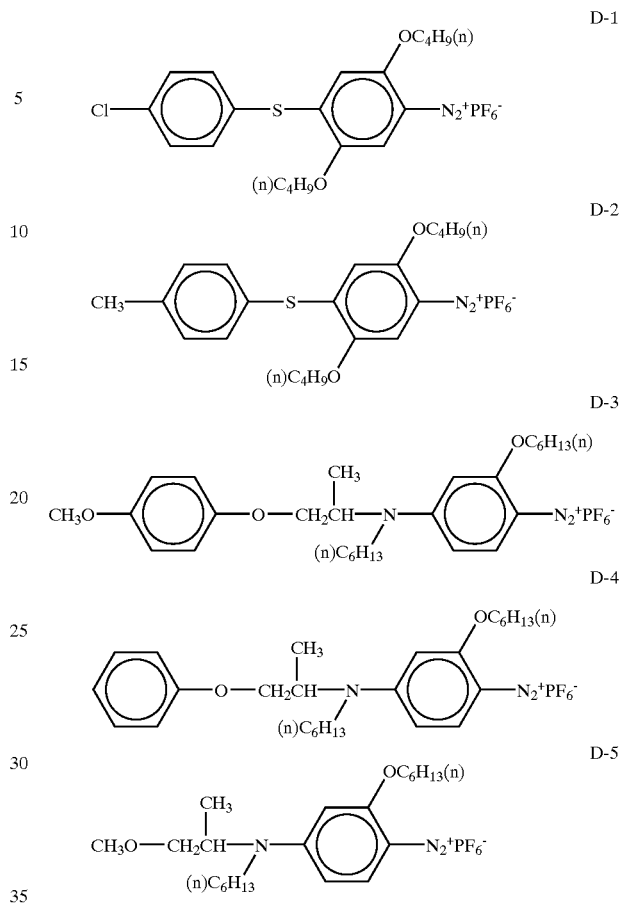

Among these diazonium salt compounds, there are particularly preferable 4-(N-(2-(2,4-di-tert-amylphenoxy)butyryl)piprazino)benzenediazonium, 4-(N-(2-ethylhexanoyl)piprazino)benzenediazonium, 4-dihexylamino-2-hexyloxybenzenediazonium, 4-N-ethyl-N-hexadecylamino-2-ethoxybenzodiazonium, 2,5-dibutoxy-4-(N-(2-ethylhexanoyl)piperazino) benzenediazonium, 2,5-diethoxy-4-(N-(2-(2,4-di-tert-amylphenoxy)butyryl) piperazino)benzenediazonium, which are decomposed by photolysis according to light having wave length of 300 to 400 nm, and diazonium salt compounds shown in the above-mentioned specific examples of D-3 to 5.

Further, the maximum absorption wave length of the diazonium salt compounds was obtained by measuring the coating films in which the respective diazonium compounds were coated by a coating amount of 0.1 to 1.0 g/m², by a spectrophotometer (Shimadzu MPS-2000).

Example of the coupler which carries out a coupling reaction with the diazonium salt compound at heating to be colored includes resorcin, fluoroglycine, sodium 2,3-dihydroxynaphthalene-6-sufonate, 1-hydroxy-2-naphthoic acid morpholinopropylamide, 1,5-dihydroxynaphthalene, 2,3-dihydroxynaphthalene, 2,3-dihydroxy-6-sulfanylnaphthalene, 2-hydroxy-3-naphthoic acid anilide, 2-hydroxy-3-naphthoic acid ethanolamide, 2-hydroxy-3-naphthoic acid octylamide, 2-hydroxy-3-naphthoic acid-N-dodecyloxypropyl amide, 2-hydroxy-3-naphthoic acid tetradecylamide, acetanilide, benzoylacetanilide, 2-chloro-5-octylacetanilide, 1-phenyl-3-methyl-5-pyrazolone, 1-(2'-octylphenyl)-3-methyl-5-pyrazolone, 1-(2',4',6'-trichlorophenyl)-3-benzamido-5-pyrazolone, 1-(2',4',6'- trichlorophenyl)-3-anilino-5-pyrazolone, 1-phenyl-3-phenylacetamido-5-pyrazolone, compounds shown in (C1 to C6) described below, and the like. These couplers may be used alone or two or more may be used in combination.

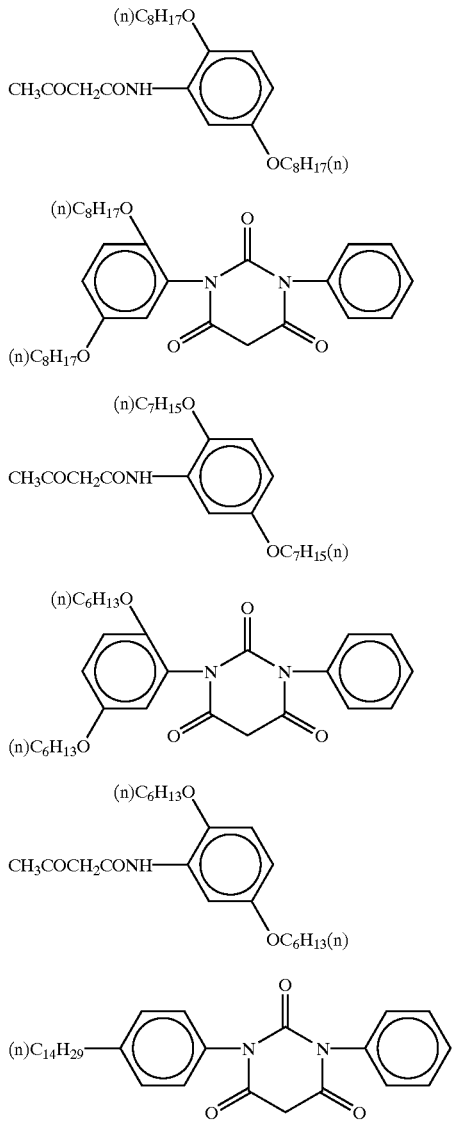

The basic substance is not particularly limited, and can be appropriately selected from known substances in accordance with purposes. Compounds which provokes decomposition and the like at heating and discharges an alkaline substance are included, in addition to inorganic or organic basic compounds. As typical compounds, there are mentioned nitrogen-containing compounds such as an organic ammonium salt, an organic amine, an amide, urea and thiourea, and derivatives thereof; thiazoles, pyrroles, pyrimidines, piperazines, guanidines, indoles, imidazoles, imidazolines, triazoles, morpholines, piperidines, amidines, formamidines and pyridines.

The specific example of these include tricyclohexylamine, tribenzylamine, octadecylbenzylamine, stearylamine, allylurea, thiourea, methylthiourea, arylthiourea, ethylenethiourea, 2-benzylimidazole, 4-phenylimidazole, 2-phenyl-4-methylimidazole, 2-undecylimidazoline, 2,4,5-trifuryl-2-imidazoline, 1,2-diphenyl-4,4-dimethyl-2-imidazoline, 2-phenyl-2-imidazoline, 1,2,3-triphenylguanidine, 1,2-dicyclohexylguanidine, 1,2,3-tricyclohexylguanidine, guanidine trifluoroacetate, N,N'-dibenzylpiperazine, 4,4'-dithiomorpholine, mopholinium trifluoroacetate, 2-aminobenzothiazole, 2-benzoylhydrazinobenzothiazole and the like. These may be used alone or two or more may be used in combination.

The electron-donating colorless dye is not particularly limited, and can be appropriately selected from known dyes in accordance with purposes. In the present invention, the precursor of the electron-donating colorless dye can be used.

As a precursor of the electron-donating colorless dye, for example, a triallylmethane-base compound, a diphenylmethane-base compound, a thiazine-base compound, a xanthene-base compound, a spiropyran-base compound, and the like are mentioned. These may be used alone or two or more may be used in combination. Among these, a triallylmethane-base compound and a xanthene-base compound are preferable from the viewpoint that coloring concentration is high and useful. The example of these compounds includes 3,3-bis(p-dimethylaminophenyl)-6-dimethylaminophthalide (namely, crystal violet lactone), 3,3-bis(p-dimethylamino)phthalide, 3-(p-dimethylaminophenyl)-3-(1,3-dimethylindol-3-yl) phthalide, 3-(p-dimethylaminophenyl)-3-(2-methylindol-3-yl)phthalide, 3-(o-methyl-p-dimethylaminophenyl)-3-(2-methylindol-3-yl)phthalide, 4,4'-bis(dimethylamino) benzhydrine benzyl ether, N-halophenylleuco auramine, N-2,4,5-trichlorophenylleuco auramine, Rohdamine-B-anilinolactam, Rohdamine(p-nitroanilino) lactam, Rohdamine-B-(p-chloroanilino)lactam, 2-benzylamino-6-diethylaminofluoran, 2-anilino-6-diethylaminofluoran, 2-anilino-3-methyl-6-diethylaminofluoran, 2-anilino-3-methyl-6-cyclohexylmethylaminofluoran, 2-anilino-3-methyl-6-isoamylethylaminofluoran, 2-(o-chloroanilino-6-diethylaminofluoran, 2-octylamino-6-diethylaminofluoran, 2-ethoxyethylamino-3-chloro-2-diethylaminofluoran, 2-anilino-3-chloro-6-diethylaminofluoran, benzoylleucomethylene blue, p-nitrobenzoylleucomethylene blue, 3-methyl-spiro-dinaphthopyran, 3-ethyl-spiro-dinaphthopyran, 3,3'-dichloro-spiro-dinaphthopyran, 3-benzyl-spiro-dinaphthopyran, 3-propyl-spiro-dinaphthopyran, and the like.

As the electron-accepting compound, a phenol derivative, a salicylic acid derivative, a hydroxybenzoic acid ester, and the like are mentioned. Among these, bisphenols and hydroxybenzoic acid esters are particularly preferable. Specifically, 2,2-bis(p-hydroxyphenyl)propane (namely, bisphenol A), 4,4'-bis(p-phenylenediisopropylidene) diphenol (namely, bisphenol P), 2,2-bis(p-hydroxyphenyl) pentane, 2,2-bis(p-hydroxyphenyl)ethane, 2,2-bis(p-hydroxyphenyl)butane, 2,2-bis(4'-hydroxy-3', 5'-dichlorophenyl)propane, 1,1-(p-hydroxyphenyl) cyclohexane, 1,1-(p-hydroxyphenyl)propane, 1,1-(p-hydroxyphenyl)pentane, 1,1-(p-hydroxyphenyl)-2-ethylhexane, 3,5-di(α-methylbenzyl)salicylic acid and a polyvalent metal salt thereof, 3,5-di(tert-butyl)salicylic acid and a polyvalent metal salt thereof, 3-α,α-dimethylbenzylsalicylic acid and a polyvalent metal salt thereof, butyl p-hydroxybenzoate, benzyl p-hydroxybenzoate, 2-ethylhexyl p-hydroxybenzoate, p-phenylphenol, p-cumyllhenol and the like are particularly preferable.

In the present invention, it is preferable that the heat-sensitive recording layer contains a sensitizer, and as the sensitizer, a low melting point organic compound which has appropriately an aromatic group and a polar group in a molecule. Specifically, p-benzyl benzyloxybenzoate, α-naphthyl benzyl ether, β-naphthyl benzyl ether, phenyl β-naphthoate, phenyl a-hydroxy-β-naphthoate, β-naphthol-(p-chlorobenzyl)ether, 1,4-butanedial phenyl ether, 1,4-butanedial-p-methy phenyl ether, 1,4-butanediol-p-ethyl phenyl ether, 1,4-butanediol-m-methyl phenyl ether, 1-phenoxy-2-(p-tolyloxy) ethane, 1-phenoxy-2-(p-ethylphenoxy) ethane, 1-phenoxy-2-(p-chlorophenoxy) ethane, p-benzylbiphenyl and the like are mentioned.

Further, it is preferable that the heat-sensitive recording layer contains the compound represented by the following general formula (A) by 0.05 g/m² or more. When the heat-sensitive recording layer comprises a plural number of layers, the layer in which the compound represented by the general formula (A) is contained is not particularly limited, and can be appropriately selected in accordance with purposes, but it is preferable that it is a layer constituted by a solid dispersion product.

$$R—SO_3M \qquad \text{General formula (A)}$$

In the general formula (A), R represents an alkyl group, an aryl group, an alkoxy group, an aryloxy group, a polyoxyethylenearyl group, or a polyoxyethylenealkyl group, and an alkyl group having 1 to 20 carbons is preferable, an aryl group having 1 to 30 carbons is preferable, an alkoxy group having 1 to 30 carbons is preferable, an aryloxy group having 1 to 30 carbons is preferable, a polyoxyethylenearyl group having 1 to 30 carbons is preferable, and a polyoxyethylenealkyl group having 1 to 20 carbons is preferable. M represents an alkali metal, and sodium, potassium and the like are preferable.

As the specific example of the compound represented by the general formula (A), sodium laurylsulfate, sodium higher alcoholsulfate, sodium dodecylbenzenesulfonate, sodium alkylnaphthalenesulfonate, sodium dialkylsulfosuccinate, sodium alkyldiphenyl ether disulfonate, sodium polyoxyethylene lauryl ether sulfate, sodium polyoxyethylene alkyl ether sulfate, sodium polyoxyethylene alkylphenyl ether sulfate, sodium alkanesulfonate, sodium salt of formalin condensate of β-naphthalenesulfonic acid, sodium salt of formalin condensate of specific aromatic sulfonic acid, and the like are mentioned. These may be used alone or two or more may be used in combination. In the present invention, among these, sodium dodecylbenzenesulfonate which is represented by the following formula is preferable from the viewpoint of improving the coloring by exposure of a texture portion.

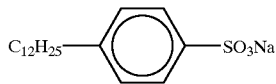

The content in the heat-sensitive recording layer of the compound represented by the general formula (A) is 0.05 g/m² or more, preferably 0.05 to 0.50 g/m² or more, and more preferably 0.05 to 0.20 g/m² or more.

When the content is less than 0.05 g/m², the light resistance of the heat-sensitive recording layer is not adequate, and it is not preferable from the viewpoint of generating the coloring by exposure of a texture portion. On the other hand, when it is 0.05 g/m² or more, there is no such phenomenon, the light resistance of the heat-sensitive recording material is remarkably improved, and it is preferable from the viewpoint of effectively suppressing the coloring by exposure of a texture portion.

The aspect containing the diazonium salt compound, the coupler which colors by reacting with the diazonium salt compound at heating, the basic compound, the electron-donating colorless dye, the electron-accepting compound, the sensitizer and the like, in the heat-sensitive recording layer is not particularly limited, and can be appropriately selected in accordance with purposes. For example, (1) a method of containing these by solid dispersion, (2) a method of containing these by emulsification dispersion, (3) a method of containing these by polymer dispersion, (4) a method of containing these by latex dispersion, (5) a method of containing these by microencapsulation, and the like are mentioned.

Among these, the method of containing these by microencapsulation is preferable from the viewpoint of preservation. When the coloring reaction of the coupler with the diazonium salt compound is utilized, it is preferable that the diazonium salt compound is encapsulated to be contained in the heat-sensitive recording layer, and when the coloring reaction of the electron-donating colorless dye with the electron-accepting compound is utilized, it is preferable that the electron-donating colorless dye is encapsulated to be contained in the heat-sensitive recording layer.

When the heat-sensitive recording layer is made as a multi-layer structure, the multicolor heat-sensitive recording material can be obtained by changing the hue of the respective heat-sensitive recording layers. The layer constitution at this time is not particularly limited, and can be appropriately selected in accordance with purposes, but it is preferable in the present invention that the multicolor heat-sensitive recording layer is made by laminating two of the heat-sensitive recording layers in which two diazonium salt compounds having different photosensitive wave lengths are combined with couplers which color to different hues by reaction with the respective diazonium salt compounds at heating, and the heat-sensitive recording layer in which the electron-donating colorless dye and the electron-accepting compound are combined. Namely, it is preferable that the multicolor heat-sensitive recording material is made by laminating a heat-sensitive recording layer A in which the electron-donating colorless dye and the electron-accepting compound are contained, a heat-sensitive recording layer B-1 in which a diazonium salt compound having a maximum absorption wave length of 360±20 nm and a coupler which colors by reaction with the diazonium salt compound at heating are contained, and a heat-sensitive recording layer B-2 in which a diazonium salt compound having a maximum absorption wave length of 400±20 nm and a coupler which colors by reaction with the diazonium salt compound at heating are contained, in this order on the support.

As the recording method of the multicolor heat-sensitive recording material, the heat-sensitive recording layer B-2 is firstly heated, and the diazonium salt compound which is contained in the heat-sensitive recording layer B-2, and the coupler are colored. Then, after the unreacted diazonium salt compound which is contained in the heat-sensitive recording layer B-2 is decomposed by irradiating light of 400±20 nm, heat by which the heat-sensitive recording layer B-1 is adequately colored is added, and the diazonium salt compound which is contained in the heat-sensitive recording layer B-1 and the coupler are colored. At this time, although the heat-sensitive recording layer B-2 is also strongly heated at the same time, the diazonium salt compound has been already decomposed, and coloring ability is already lost, therefore no coloring is observed. Further, the diazonium salt compound which is contained in the heat-sensitive recording layer B-1 is decomposed by irradiating light of 360±20 nm, heat by which the heat-sensitive recording layer A is adequately colored is finally added, and the layer A is colored. At this time, although the heat-sensitive recording layer B-2 and the heat-sensitive recording layer B-1 are also strongly heated at the same time, the diazonium salt compound has been already decomposed, and coloring ability is already lost, therefore no coloring is observed.

Further, in the present invention, it is preferable that the multicolor heat-sensitive recording layer is made by laminating the three heat-sensitive recording layers which combined 3 kinds of diazonium salt compounds having different photosensitive wave lengths with couplers which color to different hues by reaction with the respective diazonium salt compounds at heating. Namely, it is preferable that the multicolor heat-sensitive recording material is made by laminating a heat-sensitive recording layer A-1 which contains a diazonium salt compound having a maximum absorption wave length of 350 nm or less and preferably 340 nm or less and a coupler which is colored by reaction with the diazonium salt compound at heating, a heat-sensitive recording layer A-2 which contains a diazonium salt compound having a maximum absorption wave length of 360±20 nm and a coupler which is colored by reaction with the diazonium salt compound at heating, a heat-sensitive recording layer A-3 which contains a diazonium salt compound having a maximum absorption wave length of 400±20 nm and a coupler which is colored by reaction with the diazonium salt compound at heating, in this order on the support.

In case of the multicolor heat-sensitive recording material above, a full color image can be recorded by selecting the coloring hues of the respective heat-sensitive recording layers so as to be the three primary colors of yellow, magenta and cyan in subtractive color mixing.

Protective Layer

The protective layer is a layer which is provided for protecting the sticking of the heat-sensitive recording layer and the heat-sensitive recording layer from a solvent or the like, and contains preferably a pigment.

The binder which is preferably used for the protective layer includes a modified polyvinyl alcohol (a silanol-modified polyvinyl alcohol, a long chain alkyl ether-modified polyvinyl alcohol, an acetoacetyl-modified polyvinyl alcohol, a carboxy-modified polyvinyl alcohol and the like), a polyvinyl alcoholsilicone-modified polymer, carboxymethyl cellulose, hydroxyethyl cellulose and the like. The respective binders may be used alone and two or more may be used in combination.

As the pigment, inorganic ultra fine particles are preferable, and example of the inorganic ultra fine particles includes colloidal silica, zirconium oxide, barium sulfate, aluminum oxide (alumina), zinc oxide, magnesium oxide, calcium oxide, cerium oxide, titanium oxide and the like. The respective pigments may be used alone and two or more may be used in combination.

The protective layer is preferably obtained by coating the protective layer coating solution which contains a silanol-modified polyvinyl alcohol and colloidal silica, on the heat-sensitive recording layer and the like using devices such as a bar coater, an air knife coater, a blade coater and a curtain coater. However, the protective layer may be coated by superimposition at the same time with the heat-sensitive recording layer, or the heat-sensitive recording layer and the like may be dried once after coating the heat-sensitive recording layer and the like and the protective layer may be coated thereon. The dried coating amount of the protective layer is preferably 0.1 to 3 g/m$^2$ and more preferably 0.3 to 2.0 g/m$^2$. When the coating amount is large, thermal sensitivity is remarkably lowered, and when the coating amount is too low, functions (wear resistance, lubricity, scratch resistance and the like) as the protective layer cannot be exhibited. Further, a calendar treatment may be carried out after coating the protective layer, if necessary.

Support

As the support, for example, a paper, a synthetic paper, a paper having a plastic resin layer and the like are mentioned in addition to polyester films such as a polyethylene terephthalate and a polybutylene terephthalate, cellulose derivative films such as a cellulose triacetate film, polyolefin films such as a polystyrene film, a polypropylene film and a polyethylene film, plastic films such as a polyimide film, a polyvinyl chloride film, a polyvinylidene chloride film, a polyacrylic acid copolymer film and a polycarbonate film. The support having the layer of the plastic film is preferable. These may be transparent or opaque, and they may be used alone, or two or more used in combination.

As the support having the layer of the plastic, there are preferably mentioned those in which the layer of a thermoplastic resin was formed on both sides of a base paper or at least on a face on which the recording layer is formed. For example, there are mentioned (1) those in which a thermoplastic resin was melt extruded and coated on a base paper, (2) those in which a gas barrier layer was coated on a thermoplastic resin which was melt extruded and coated on a base paper, (3) those in which a plastic film having a low oxygen permeability was adhered on a base paper, (4) those in which a thermoplastic resin was melt extruded and coated on a face in which a plastic film was adhered on a base paper, (5) those in which a plastic film was adhered after melt extruding a thermoplastic resin and coating it on a base paper, and the like.

As the thermoplastic resin which is melt extruded and coated on the base paper, for example, there are preferably mentioned olefin-base polymers such as homopolymers of an α-olefin such as a polyethylene and a polypropylene and a mixture of these various polymers, random copolymers of ethylene and vinyl alcohol, and the like. As the polyethylene, for example, LDPE (low density polyethylene), HDPE (high density polyethylene), L-LDPE (linear low density polyethylene) and the like are mentioned.

The method of adhering the plastic film on the base paper is not particularly limited, and can be appropriately selected from known lamination methods which are described in "New Lamination Processing Hand Book" edited by Society for Scientific Research of Processing Technology. A so-called dry lamination, a non-solvent type dry lamination, a dry lamination using electron beam- or ultraviolet-cure type resin, or a hot dry lamination is preferably mentioned.

In the present invention, a support in which an olefin-base polymer was coated on both sides of a base paper in which natural pulp is a main component is preferable among the supports, in particular.

Undercoat Layer

In the present invention, those having an undercoat layer between the support and the heat-sensitive recording layer are preferable.

The undercoat layer is not particularly limited, and can be appropriately selected from known undercoat layers in accordance with purposes, but is preferably an undercoat layer which contains gelatin having a viscosity of PAGI method of 10 to 30 mP and having a jelly strength of PAGI method of 15 to 70 g (hereinafter, simply referred to as "gelatin") and a stratiform inorganic compound, in particular. Further, in the present invention, those having such layer as the intermediate layer described later and the like are also preferable.

The viscosity of PAGI method and the jelly strength of PAGI method were measured based on "PAGI Method: Gelatin Test Method for Photograph" the 7$^{th}$ Edition published by Joint Examining Committee of Gelatin Test Method for Photograph (1992).

The gelatin can be obtained by making known gelatin which was prepared by a usual method, be a low molecule (hereafter referred to as "usual gelatin"). Provided that "usual gelatin" mentioned here is gelatin which is produced by treating raw materials, for example, such as a cow bone, a cattle hide and a pig skin which are described in "Glue and Gelatin" (edited by Yoshihiro Abiko, and published by Japanese Glue and Gelatin Industry Union (1987)), with a lime, an acid and the like, and has by far a large viscosity and jelly strength in comparison with the gelatin.

The usual gelatin is characterized by conditions such as a raw material, a treatment method (for example, treatment by a lime, treatment by an acid), and treatment conditions (temperature, extraction times). The gelatin may be made be low molecule based on any gelatin, but gelatin which has little extraction times and was extracted at a low temperature is preferable from the viewpoint of capable of making the low viscosity and jelly strength be compatible within the value range.

As the method of making gelatin be low molecule, a method of using enzyme, a method of using heat and the like are mentioned, and among these, a method of using enzyme is preferable. In case of the method of using heat, the jelly strength happens to be low when the viscosity is lowered to a preferable value. Further, for example, papain is preferably mentioned as the enzyme.

The viscosity of PAGI method in the gelatin is from 10 to 30 mP and the jelly strength of PAGI method is from 15 to 70 g, but when the viscosity of PAGI method is less than 10 mP, the viscosity of a coating solution is greatly lowered, and the dispersion condition of a pigment (mica) in the coating solution is deteriorated. When the viscosity exceeds 30 mP, the viscosity of the coating solution is raised, and coating trouble happens to be generated. Further, when the jelly strength of PAGI method is less than 15 g, the strength of a coating film is lowered, and the adhesion strength with the support happens to be lowered. When the jelly strength of PAGI method is larger than 70 g, the curl of the coating film happens to be enlarged by the change of environment.

The gelatin may be crosslinked using a curing agent according to requirement, and in that case, known curing agents which are used as the curing agent of gelatin are mentioned as the curing agent. For example, a vinyl sulfone compound, an active halogen compound, an isocyanate compound, an epoxy compound, and the like are mentioned. Among these, the epoxy compound is particularly preferable, and as the epoxy compound, for example, compounds shown below are preferably mentioned.

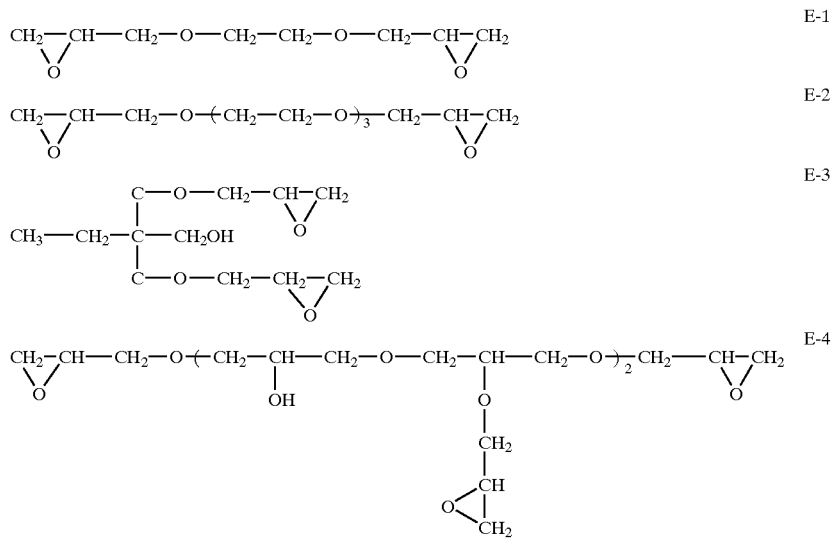

The coating amount of the gelatin in the undercoat layer is preferably 0.5 g/m$^2$ or more from the viewpoint of suppressing blister (a fine swelling phenomenon by the heat of a printer thermal head at print recording).

As the stratiform inorganic compound, a swelling stratiform inorganic compound is preferably mentioned. Specific example of the swelling stratiform inorganic compound includes swelling clay minerals such as bentonite, hectorite, saponite, beadelite, nontronite, stevensite, beidellite, montmorillonite; swelling synthetic mica, swelling synthetic smectite and the like.

These swelling stratiform inorganic compounds have a lamination structure comprising a unit crystal lattice layer having a thickness of about from 10 to 15 angstrom, and the substitution of a metal atom in the lattice is remarkably larger than other clay mineral. As a result, the deficiency of positive charge is generated in the lattice layer, cations such as Na$^+$, Ca$^{2+}$ and Mg$^{2+}$ are absorbed between layers in order to compensate it. These cations which intervene between layers are called as "exchangeable cation", and exchanged with various cations. In particular, when the cation between layers is Li$^+$, Na$^+$ and the like, the bonding between laminar crystal lattices is weak because the radius of the cation is small, and it is greatly swollen by water. When a shear is imposed, it is easily cleaved to form a sol which is stable in water. Among the specific examples of the swelling stratiform inorganic compounds, bentonite and a swelling synthetic mica are preferable from the viewpoint of its high tendency, and the swelling synthetic mica is particularly preferable.

As the swelling synthetic mica, for example, compounds below are preferably mentioned.

Na tetrasic mica: $NaMg_{2.5}(Si_4O_{10})F_2$,
Na or Li taeniolite: $(NaLi)Mg_2(Si_4O_{10})F_2$,
Na or Li hectorite: $(NaLi)_{1/3}Mg_{2/3}Li_{1/3}(Si_4O_{10})F_2$, and the like are mentioned.

As the size of the swelling synthetic mica, the thickness is 1 to 50 nm, and planar size is from 1 to 20 μm. It is preferable that the thickness is the thinner, the better from the viewpoint of controlling diffusion, and the planar size is the larger, the better within the range of not deteriorating the smoothness and transparency of the coating face. The aspect ratio of the swelling synthetic mica is usually 100 or more, preferably 200 or more and more preferably 500 or more.

In case of using the usual gelatin, when the ratio (1.5 to 10 or more against gelatin) of mica is increased, gelation proceeds, therefore it is required to reduce its concentration. There is a method of lowering the concentration in order to lower the viscosity, but the lowering of the concentration increases the drying load of a coating film, and the condition of the coating film face is deteriorated because of thick coating. Further, there is a method of adding urea, a salt and the like to the coating solution, but the viscosity cannot be adequately lowered, and the condition of the coating face after coating is bad. To the contrary, the gelatin can remarkably reduce the increase of viscosity and gelation without generating such evil, and even if it is used by being mixed with mica, it is advantageous from the viewpoint of capable of remarkably reducing the increase of viscosity and gelation.

The content of the water swelling synthetic mica in the undercoat layer is preferably from 1/20 to 1/2 at a mass ratio of mica/gelatin.

When the content of the water swelling synthetic mica is less than 1/20, the undercoat layer happens not to function as an oxygen barrier layer adequately, and when it exceeds 1/2, the production aptitudes such as coating property and the like happen to be deteriorated.

Further, the coating amount of mica in the undercoat layer is usually 0.01 g/m$^2$ or more and preferably 0.02 g/m$^2$ or more.

When the coating amount of mica is less than 0.01 g/m$^2$, the ability of oxygen barrier in the undercoat layer is lowered, and it happens not to be able to reveal a property of preventing the coloration of a texture portion and the like.

Intermediate Layer

In the present invention, it is preferable to provide an intermediate layer for preventing color mixing and the like between the respective heat-sensitive recording layers when the heat-sensitive recording layer is made as a lamination structure comprising the heat-sensitive coloring layers which have different hues.

The intermediate layer is not particularly limited, and can be appropriately selected in accordance with purposes but can be formed using a water soluble polymer compound and the like.

As the water soluble polymer compound, for example, those which comprise a polyvinyl alcohol, a modified polyvinyl alcohol, methyl cellulose, sodium polystyrenesulfonate, a styrene-maleic anhydride copolymer, gelatin and/or a gelatin derivative, a polyethylene glycol and/or a polyethylene glycol derivative are preferably mentioned.

Further, the stratiform inorganic compound can be preferably added to the intermediate layer. When the intermediate layer contains the stratiform inorganic compound, color mixing can be prevented by suppressing and preventing the migration of a substance between layers, and the raw preservation property and the preservation property of color image can be improved by suppressing the supply of oxygen.

Antioxidant

In the present invention, known antioxidants that are shown below can be added to the heat-sensitive recording material in order to improve the light resistance.

Examples of such antioxidants include antioxidants which are described in European Patent Application Laid-Open (EP-A) No.310551, German Patent Application Laid-Open No.3435443, EP-A No.310552, Japanese Patent Application Laid-Open (JP-A) No.3-121449, EP-A No.459416, JP-A Nos.2-262654, 2-71262 and 63-163351, U.S. Pat. No. 4,814,262, JP-A Nos.54-48535, 5-61168 and 5-119449, U.S. Pat. No. 4,980,275, JP-A Nos.63-113536 and 62-262047, EP-A Nos.223739, 309402 and 309401 and the like. Specifically, antioxidants below are mentioned.

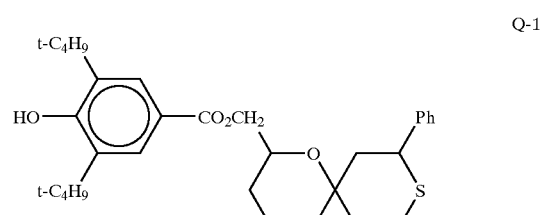

Q-1

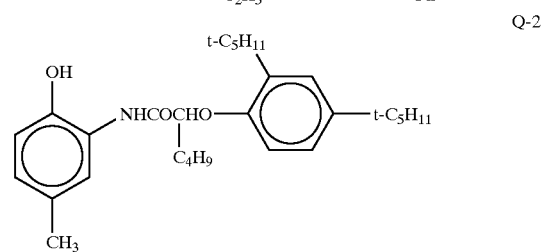

Q-2

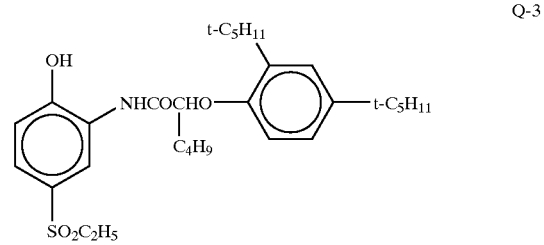

Q-3

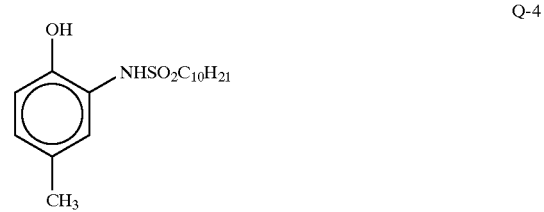

Q-4

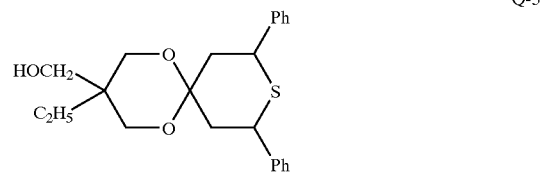

Q-5

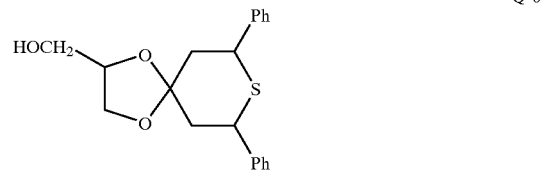

Q-6

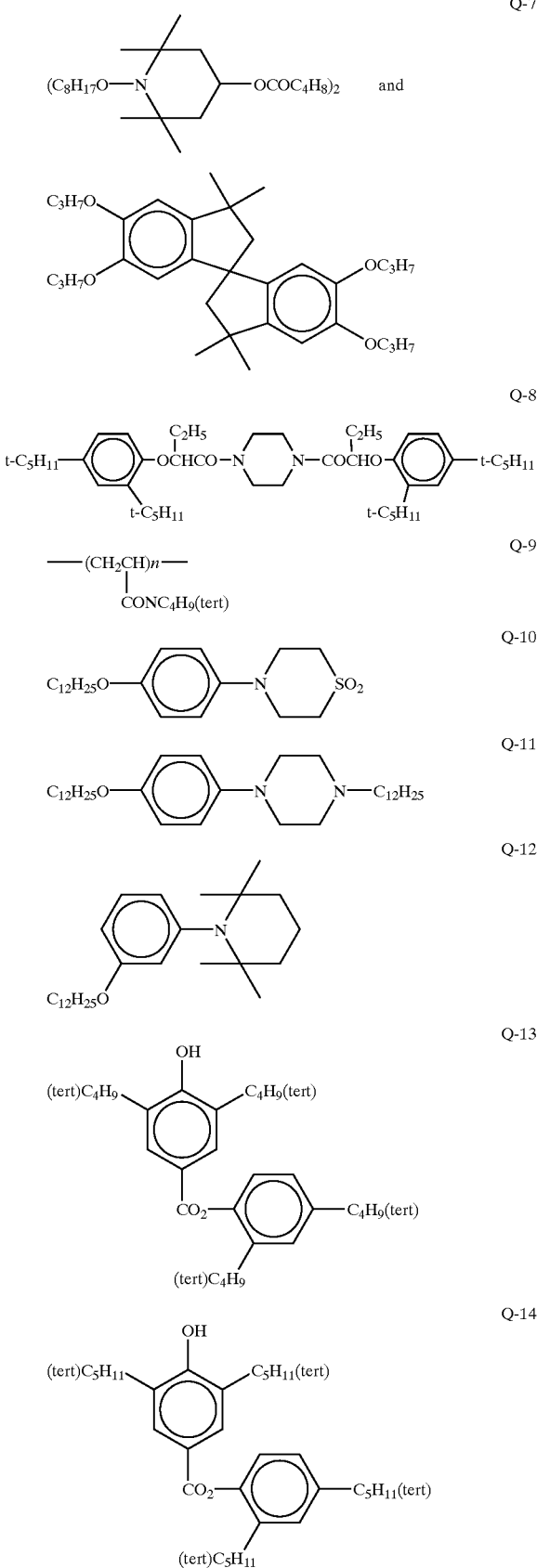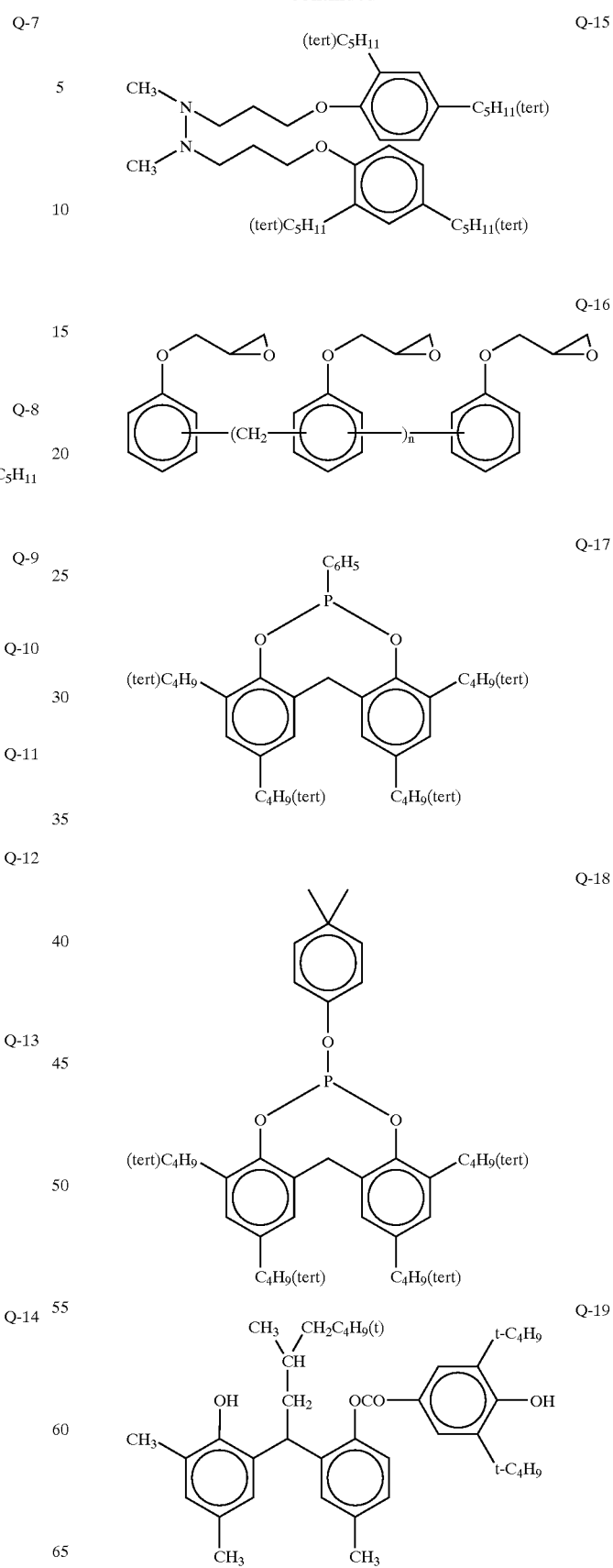

Q-20
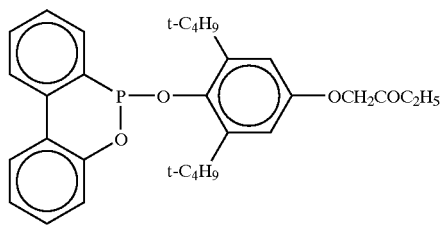

Q-21
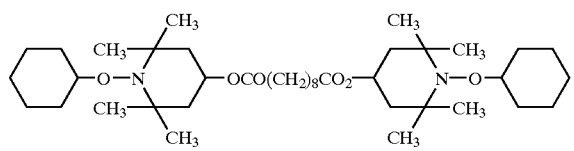

Q-22
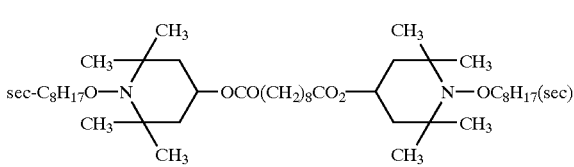

Q-23
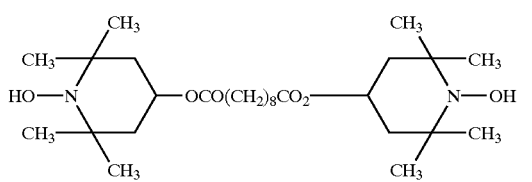

Q-24

Q-25

Q-26 (C$_{14}$H$_{29}$OCOCH$_2$CH$_2$)$_2$S

Q-27 (C$_{18}$H$_{37}$OCOCH$_2$CH$_2$)$_2$S

Q-28 (C$_{12}$H$_{25}$SCH$_2$CH$_2$CO$_2$CH$_2$)$_4$C

Further, there are mentioned antioxidants which are described in JP-A Nos.60-125470, 60-125471, 60-125472, 60-287485, 60-287486, 60-287487, 62-146680, 60-287488, 62-282885, 63-89877, 63-88380, 63-088381, 01-239282, 04-291685, 04-291684, 05-188687, 05-188686, 05-110490, 05-1108437, 05-170361, 63-203372, 63-224989, 63-267594, 63-182484, 60-107384, 60-107383, 61-160287, 61-185483, 61-211079, 63-251282 and 63-051174, Japanese Patent Application Publication (JP-B) Nos.48-043294 and 48-033212 and the like.

Specific example includes 6-ethoxy-1-phenyl-2,2,4-trimethyl-1,2-dihydroquinoline, 6-ethoxy-1-octyl-2,2,4-trimethyl-1,2-dihydroquinoline, 6-ethoxy-1-phenyl-2,2,4-trimethyl-1,2,3,4-tetrahydroquinoline, 6-ethoxy-1-octyl-2,2, 4-trimethyl-1,2,3,4-tetrahydroquinoline, nickel cyclohexanate, 2,2-bis-4-hydroxyphenylpropane, 1,1-bis-4-hydroxyphenyl-2-ethylhexane, 2-methyl-4-methoxy-diphenylamine, 1-methyl-2-phenylomdole, and the like.

These antioxidants can be added to the heat-sensitive recording layer, the intermediate layer, the light transmittance adjusting layer and the protective layer.

EXAMPLES

Examples of the present invention are illustrated below, but the present invention is not limited to these examples. Further, "part" means "part by mass" and "%" means "% by mass" unless otherwise specifically noticed below.

Example 1

Preparation of Phthalated Gelatin Solution

32 Parts of phthalated gelatin (trade name: MGP Gelatin, manufactured by Nippi Colagen Co., Ltd.), 0.9143 part of 1,2-benzothiazolin-3-on (3.5% methanol solution, manufactured by Daito Chemical Industries, Ltd.) and 367.1 parts of ion exchanged water were mixed, and the mixture was dissolved at 40° C. to obtain an aqueous solution of phthalated gelatin.

Preparation of Gelatin Solution for Preparing Emulsion 25.5 Parts of alkali-treated low ion gelatin (trade name: #750: manufactured by Nitta Gelatin Inc.), 0.7286 part of 1,2-benzothiazolin-3-on (3.5% methanol solution, manufactured by Daito Chemical Industries, Ltd.), 0.153 part of calcium hydroxide and 143.6 parts of ion exchanged water were mixed, and the mixture was dissolved at 50° C. to obtain an aqueous solution of gelatin for preparing emulsion.

(1) Preparation of Coating Solution (a) for Yellow Heat-Sensitive Recording Layer Preparation of Microcapsule Solution (a) Containing Diazonium Salt Compound 2.2 Parts of the following diazonium salt compound (A) (maximum absorption wave length: 420 nm), 2.2 parts of the following diazonium salt compound (B) (maximum absorption wave length: 420 nm), 4.8 parts of monoisopropylbiphenyl, 4.8 parts of diphenyl phthalate, and 0.4 part of diphenyl-(2,4,6-trimethyl benzoyl)phosphine oxide (trade name: LUCIRIN TPO, manufactured by BASF Japan Ltd.) were added to 16.1 parts of ethyl acetate, and the mixture was heated to 40° C. to be homogeneously dissolved. To the mix solution obtained, 8.6 parts of a mixture of an adduct of xylylene diisocyanate/trimethylolpropane and an adduct of xylylene diisocyanate/bisphenol A (trade name: TAKENATE D119N (50% ethyl acetate solution), manufactured by Takeda Chemical Industries, Ltd.) as a capsule wall material was added, and the mixture was homogeneously stirred to obtain a mix solution (I).

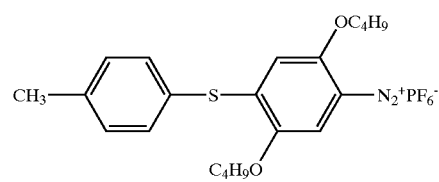

Diazonium salt compound (A)

-continued

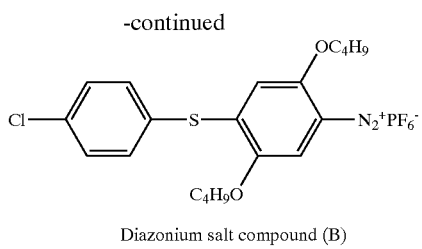

Diazonium salt compound (B)

Separately, 16.3 parts of ion exchanged water and 0.34 part of ScrapH (AG-8 (50%): manufactured by Nippon Fine Chemical Co., Ltd.) were added to 50 parts of the above-mentioned aqueous solution of phthalated gelatin to obtain a mix solution (II).

The mix solution (I) was added to the mix solution (II), and the mixture was emulsified to be dispersed at 40° C. using a homogenizer (manufactured by Nihon Seiki Manufacturing Co.). 20 Parts of water was added to the emulsified solution which was obtained, the mixture was homogenized, then stirred at 40° C., and an encapsulation reaction was carried out for 3 hours while removing ethyl acetate. Then, 4.1 parts of Amberlite IRA68 (manufactured by Organo Corporation) of an ion exchange resin and 8.2 parts of Amberlite IRC50 (manufactured by Organo Corporation) were added thereto and the mixture was further stirred for one hour. Then, the ion exchange resin was removed by filtration, the concentration was adjusted so that the solid concentration of a capsule solution is 20.0%, and the microcapsule solution (a) containing the diazonium salt compound was obtained. The particle diameter of the microcapsule obtained was measured by particle diameter (measured by LA-700: manufactured by Horiba Ltd.), and as a result, was 0.36 μm in a median diameter.

Preparation of Emulsified Solution (a) of Coupler Compound 9.9 Parts of the following coupler compound (C), 9.9 parts of triphenylguanidine (manufactured by Hodogaya Chemical Co., Ltd.), 20.8 parts of 4,4'-(m-phenylenediisopropylidene)diphenol (trade name; Bisphenol M, manufactured by Mitsui Petrochemical Industries, Ltd.), 13.6 parts of 4-(2-ethylhexyloxy)benzenesulfonic acid amide (manufactured by Manac Incorporated), 6.8 parts of 4-n-pentyloxybenzenesulfonic acid amide (manufactured by Manac Incorporated), and 4.2 parts of calcium dodecylbenzenesulfonate (trade name: PIONIN A-41-C 70% methanol solution, manufactured by Takemoto Oil & Fat Co., Ltd.) were dissolved in 33.0 parts of ethyl acetate to obtain a mix solution (III).

Coupler Compound C

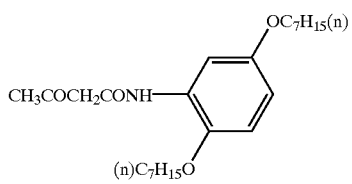

Separately, 107.3 parts of ion exchanged water was mixed with 206.3 parts of the above-mentioned aqueous solution of alkali treated gelatin to obtain a mix solution (IV).

The mix solution (III) was added to the mix solution (IV), and the mixture was emulsified to be dispersed at 40° C. using a homogenizer (manufactured by Nihon Seiki Manufacturing Co.). The emulsion of the coupler compound obtained was heated under reduced pressure, ethyl acetate was removed, and then, the adjustment of concentration was carried out so that the solid concentration becomes 26.5%. The particle diameter of the emulsion of the coupler compound obtained was measured by particle diameter (measured by LA-700: manufactured by Horiba Ltd.), and as a result, was 0.21 μm in a median diameter.

Further, 9 parts of a solution in which the concentration of SBR latex (trade name: SN-307, 48% solution, manufactured by SUMIKA ABS Latex Co., Ltd.) was adjusted to be 26.5% was added per 100 parts of the above-mentioned emulsion of the coupler compound, and the mixture was homogeneously stirred to obtain an emulsified solution (a) of the coupler compound.

Preparation of Coating Solution (a)

The microcapsule solution (a) containing the above-mentioned diazonium salt compound and the above-mentioned emulsified solution (a) of the coupler compound were mixed so that the mass ratio of the coupler compound contained/the diazo compound is 2.2/1 to obtain a coating solution (a) for an yellow heat-sensitive recording layer.

(2) Preparation of Solution of Magenta Heat-Sensitive Recording Layer

Preparation of Microcapsule Solution (b) Containing the Diazonium Salt Compound 2.8 Parts of the following diazonium salt compound (D) (maximum absorption wave length: 365 nm), 1.9 parts of diphenyl phthalate, 3.9 parts of phenyl 2-benzoyloxybenzoate, 4.2 parts of the following compound (E) (trade name: LIGHT ESTER TMP, manufactured by Kyouei Oil & Fat Co., Ltd.), and 0.1 part of calcium dodecylbenzenesulfonate (trade name: PIONIN A-41-C, 70% methanol solution, manufactured by Takemoto Oil & Fat Co., Ltd.) were added to 15.1 parts of ethyl acetate, and the mixture was homogeneously dissolved by heating. To the above-mentioned mix solution, 2.5 parts of a mixture of an adduct of xylylene diisocyanate/trimethylolpropane and an adduct of xylylene diisocyanate/bisphenol A (trade name: TAKENATE D119N (50% ethyl acetate solution), manufactured by Takeda Chemical Industries, Ltd.) and 6.8 parts of an adduct of xylylene diisocyanate/trimethylolpropane (trade name: TAKENATE D110N (75% ethyl acetate solution), manufactured by Takeda Chemical Industries, Ltd.) were added as a capsule wall material, and the mixture was homogeneously stirred to obtain a mix solution (V).

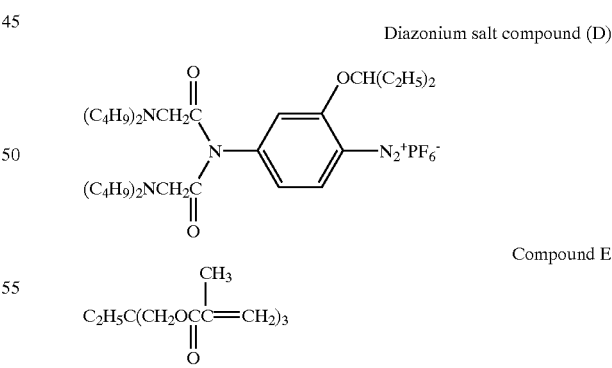

Separately, 21.0 parts of ion exchanged water was added to 55.3 parts of the above-mentioned aqueous solution of phthalated gelatin and mixed to obtain a mix solution (VI).

The mix solution (V) was added to the mix solution (VI), and the mixture was emulsified to be dispersed at 40° C. using a homogenizer (manufactured by Nihon Seiki Manufacturing Co.). 24 Parts of water was added to the emulsified solution which was obtained, the mixture was homogenized, then stirred at 40° C., and an encapsulation reaction was carried out for 3 hours while removing ethyl acetate. Then, 4.1 parts of Amberlite IRA68 (manufactured by Organo Corporation) of an ion exchange resin and 8.2 parts of Amberlite IRC50 (manufactured by Organo Corporation) were added thereto and the mixture was further stirred for one hour. Then, the ion exchange resin was removed by filtration, the concentration was adjusted so that the solid concentration of a capsule solution is 20.0%, and the microcapsule solution (b) containing the diazonium salt compound was obtained. The particle diameter of the microcapsule obtained was measured by particle diameter (measured by LA-700: manufactured by Horiba Ltd.), and as a result, was 0.43 μm in a median diameter.

Preparation of Emulsified Solution (b) of Coupler Compound 11.9 Parts of the following coupler compound (F), 14.0 parts of triphenylguanidine (manufactured by Hodogaya Chemical Co., Ltd.), 14.0 parts of 4,4'-(m-phenylenediisopropylidene)diphenol (trade name; Bisphenol M, manufactured by Mitsui Petrochemical Industries, Ltd.), 14 parts of 1,1-(p-hydroxyphenyl)-2-ethylhexane, 3.5 parts of 3,3,3',3'-tetramethyl-5,5',6,6'-tetra(1-propyloxy)-1,1'-spirobisindane, 3.5 parts of the following compound (G), 1.7 parts of tricresyl phosphate, 0.8 part of diethyl maleate, and 2.0 parts of calcium dodecylbenzenesulfonate (trade name: PIONIN A-41-C 70% methanol solution, manufactured by Takemoto Oil & Fat Co., Ltd.) were dissolved in 36.9 parts of ethyl acetate to obtain a mix solution (VII).

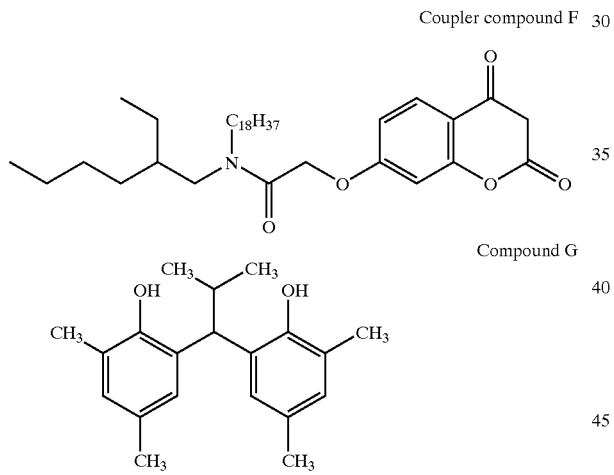

Coupler compound F

Compound G

Separately, 107.3 parts of ion exchanged water was mixed with 206.3 parts of the above-mentioned aqueous solution of gelatin for preparing emulsion to obtain a mix solution (VIII).

The mix solution (VII) was added to the mix solution (VIII), and the mixture was emulsified to be dispersed at 40° C. using a homogenizer (manufactured by Nihon Seiki Manufacturing Co.). The emulsion of the coupler compound obtained was heated under reduced pressure, ethyl acetate was removed, and then, the adjustment of concentration was carried out so that the solid concentration becomes 24.5%, to obtain an emulsified solution (b) of the coupler compound. The particle diameter of the emulsion of the coupler compound obtained was measured by particle diameter (measured by LA-700: manufactured by Horiba Ltd.), and as a result, was 0.22 μm in a median diameter.

Preparation of Coating Solution (b)

The microcapsule solution (b) containing the above-mentioned diazonium salt compound and the above-mentioned emulsified solution (b) of the coupler compound were mixed so that the mass ratio of the coupler compound contained/the diazo compound is 3.5/1. Further, an aqueous solution (5%) of polystyrenesulfonic acid (a type partially neutralized with potassium hydroxide) was mixed so as to be 0.2 part per 10 parts of the amount of the capsule solution, and a coating solution (b) for a magenta heat-sensitive recording layer was obtained.

(3) Preparation of Solution of Cyan Heat-Sensitive Recording Layer

Preparation of Microcapsule Solution (c) Containing the Precursor of the Electron-Donating Dye.

7.6 Parts of the following electron-donating dye (H), 8.0 parts of a mix solution (trade name: HIGHSOL SAS-310, manufactured by Nippon Petroleum Co., Ltd.) of 1-methylpropylphenyl-phenylmethane and 1-(1-methylpropylphenyl)-2-phenylethane, and 8.0 parts of the following compound (I) (trade name: Irgaperm 2140, Ciba-Geigy Co., Ltd.) were added to 18.1 parts of ethyl acetate, and the mixture was homogeneously dissolved by heating.

To the above-mentioned mix solution, 7.2 parts of an adduct of xylylene diisocyanate/trimethylolpropane (trade name: TAKENATE D110N (75% ethyl acetate solution), manufactured by Takeda Chemical Industries, Ltd.) and 10.6 parts of polymethylenepolyphenylpolyisocyanate (trade name: MILLIONATE MR-200, manufactured by Nippon Polyurethane Industries, Ltd.) were mixed as a capsule wall material, and the mixture was homogeneously stirred to obtain a mix solution (IX).

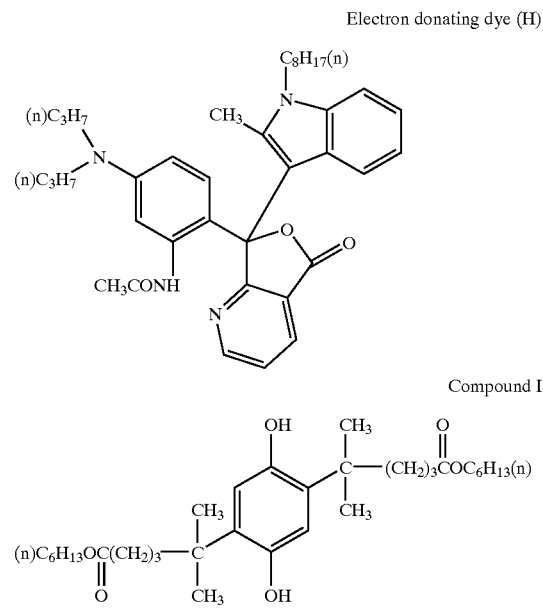

Electron donating dye (H)

Compound I

Separately, 9.5 parts of ion exchanged water, 0.17 part of ScrapH AG-8 (50%, manufactured by Nippon Fine Chemical Co., Ltd.) and 4.3 part of sodium dodecylbenzenesulfonate (10% aqueous solution) were added to 28.8 parts of the above-mentioned aqueous solution of phthalated gelatin and mixed to obtain a mix solution (X).

The mix solution (IX) was added to the mix solution (X), and the mixture was emulsified to be dispersed at 40° C. using a homogenizer (manufactured by Nihon Seiki Manufacturing Co.). 50 Parts of water and 0.12 part of tetraethylenepentamine were added to the emulsified solution which was obtained, the mixture was homogenized, then stirred at 65° C., and an encapsulation reaction was carried out for 3 hours while removing ethyl acetate. The concentration was adjusted so that the solid concentration of a capsule solution becomes 33%, and the microcapsule solution was obtained. The particle diameter of the microcapsule obtained was 1.00 μm in a median diameter, as a result of the measurement of particle diameter (measured by LA-700: manufactured by Horiba Ltd.).

Further, 3.7 parts of a 25% aqueous solution of sodium dodecylbenzenesulfonate (trade name: NEOPEREX F-25, manufactured by KAO Corporation) and 4,4'-bistriazinylaminostilbene-2,2'-disulfone derivative (trade name: Kaycall BXNL, manufactured by Nippon Soda Co., Ltd.) were added per 100 parts of the above-mentioned microcapsule solution, and the mixture was homogeneously stirred to obtain a microcapsule dispersion solution (c).

Preparation of Dispersion Solution (c) of Electron-Accepting Compound 30.1 Parts of ion exchanged water, 8.5 parts of 4,4'-(p-phenylenediisopropylidene)diphenol (trade name; Bisphenol P, manufactured by Mitsui Petrochemical Industries, Ltd.), and 3.8 parts of a 2% aqueous solution of sodium 2-ethylhexylsuccinate were added to 11.3 parts of the above-mentioned aqueous solution of phthalated gelatin, the mixture was dispersed overnight by a ball mill, and then a dispersion solution was obtained. The solid concentration of the dispersion solution was 26.6%.

45.2 Parts of the above-mentioned aqueous solution of alkali-treated gelatin was added to 100 parts of the above-mentioned dispersion solution, the mixture was stirred for 30 minutes, and then, ion exchanged water was added so that the solid concentration of the dispersion solution becomes 23.5%, to obtain a dispersion solution (c) of electron-accepting compound.

Preparation of Coating Solution (c)

The above-mentioned microcapsule solution (c) containing the precursor of the electron-donating dye and the above-mentioned dispersion solution (c) of the electron-accepting compound were mixed so that the mass ratio of the electron-accepting compound/the precursor of the electron-donating dye is 10/1 to obtain a coating solution (c) for a cyan heat-sensitive recording layer.

(4) Preparation of Coating Solution for Intermediate Layer 100.0 Parts of alkali-treated low ion gelatin (trade name; #750 Gelatin, manufactured by Nitta Gelatin Inc.), 2.857 parts of 1,2-benzothiazolin-3-on (3.5% methanol solution, manufactured by Daito Chemical Industries Ltd.), 0.5 part of calcium hydroxide, and 521.643 parts of ion exchanged was mixed, the mixture was dissolved at 50° C., and the aqueous gelatin solution for preparing the intermediate layer was obtained. 10.0 parts of the above-mentioned aqueous gelatin solution for preparing the intermediate layer, 0.05 part of sodium (4-nonylphenoxytrioxyethylene)butylsulfonate (2.0% aqueous solution, manufactured by Sankyou Chemical Co., Ltd.), 1.5 parts of boric acid (4.0% aqueous solution), 0.19 part of an aqueous solution of polystyrene-sulfonic acid (a type partially neutralized with potassium hydroxide), 4.53 parts of a 4% aqueous solution of the following compound (J) (manufactured by Wako Pure Chemical Industries Ltd.) and 0.67 part of ion exchanged water were mixed to make a coating solution for preparing the intermediate layer.

Compound J

A 3:1 mixture of

(5) Preparation of Coating Solution for Light Transmittance Adjusting Layer

Preparation of Microcapsule Solution of Precursor of Ultraviolet Absorbent

46 Parts of [2-allyl-6-(2H-benzotriazol-2-yl)-4-t-octylphenyl]benzenesulfonate as a precursor of an ultraviolet absorbent, 16 parts of 2,5-di-t-octylhydroquinone, 6 parts of tricresyl phosphate, 19 parts of α-methylstyrene dimer (trade name: MSD-100, manufactured by Mitsui Chemical Co., Ltd.) and 1.6 parts of calcium dodecylbenzenesulfonate (trade name: PIONIN A-41-C, 70% methanol solution, manufactured by Takemoto Oil & Fat Co., Ltd.) were added to 200 parts of ethyl acetate, and the mixture was homogeneously dissolved. To the above-mentioned mix solution, 94 parts of an adduct of xylylene diisocyanate/trimethylolpropane (trade name: TAKENATE D110N (75% ethyl acetate solution), manufactured by Takeda Chemical Industries, Ltd.) was added, and the mixture was homogeneously stirred to obtain a mix solution (VII) of the precursor of an ultraviolet absorbent.

Separately, 8.9 parts of a 30% aqueous solution of phosphoric acid and 532.6 parts of ion exchanged water were mixed with 52 parts of an itaconic acid-modified polyvinyl alcohol (trade name: KL-318, manufactured by Kuraray Co., Ltd.) to prepare a PVA aqueous solution for the microcapsule solution of the precursor of an ultraviolet absorbent.

The above-mentioned mix solution (VII) of the precursor of an ultraviolet absorbent was added to 1155 parts of the above-mentioned PVA aqueous solution for the microcapsule solution of the precursor of an ultraviolet absorbent, and the mixture was emulsified to be dispersed at 20° C. using a homogenizer (manufactured by Nihon Seiki Manufacturing Co.). 450 Parts of ion exchanged water was added to the emulsified solution which was obtained, the mixture was homogenized, and then, an encapsulation reaction was carried out for 3 hours while stirring at 40° C. Then, 100 parts of Amberlite MB-3 (manufactured by Organo Corporation) of an ion exchange resin was added thereto and the mixture was further stirred for one hour. Then, the ion exchange resin was removed by filtration, and the concentration was adjusted so that the solid concentration of a capsule solution is 13%. The particle diameter of the microcapsule obtained was 0.23±0.05 μm in a median diameter as a result of the measurement of particle diameter (measured by LA-700: manufactured by Horiba Ltd.). With 1244 parts of the capsule solution, 793 parts of a 10% aqueous solution of a silica-modified polyvinyl alcohol (trade name: R-1130, manufactured by Kuraray Co., Ltd., a saponification degree of 98%) having the following structural formula and 3.9 parts of a carboxy-modified styrene-butadiene latex (trade name: SN 307, (48% aqueous solution) manufactured by Sumitomo Naugatuck Co., Ltd.) were mixed to obtain the microcapsule solution of the precursor of an ultraviolet absorbent.

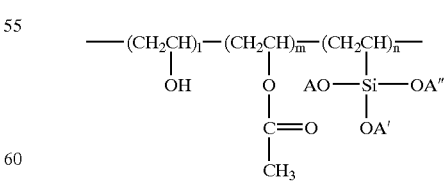

In the above-mentioned structural formula, l, m and n represent the molar ratio of polymerization, and l represents a real number from 98 to 99, m represents that from 0 to 1 and n represents that from 0 to 1, respectively. A, A' and A" each represent a $C_1$ to $C_8$ alkyl group.

Preparation of Coating Solution for Light Transmittance Adjusting Layer

With 1000 parts of the above-mentioned microcapsule solution of the precursor of an ultraviolet absorbent, 296.4 parts of ion exchanged water ion, 15.0 parts of a 4% aqueous solution of sodium hydroxide, and 51.36 parts of sodium (4-nonylphenoxytrioxyethylene)butylsulfonate (2.0% aqueous solution, manufactured by Sankyou Chemical Co., Ltd.) were mixed to obtain a coating solution for the light transmittance adjusting layer. The content of the silica-modified polyvinyl alcohol (trade name: R-1130, manufactured by Kuraray Co., Ltd., a saponification degree of 98%) was 30% by mass of the light transmittance adjusting layer. Further, when the coating solution was coated to prepare a dry film and oxygen permeability was measured, it was 0.52.

(6) Preparation of Coating Solution for Protective Layer

Preparation of Polyvinyl Alcohol Solution for Protective Layer

160 Parts of a vinyl alcohol-alkyl vinyl ether copolymer (trade name: EP-A-130, manufactured by Denki Kagaku Kogyo K.K.), 15 parts of a mix solution (trade name: NEOSCORE CM-57, (54% aqueous solution), manufactured by TOHO Chemical Industry Co., Ltd.) of sodium alkylsulfonate and polyoxyethylene alkyl ether phosphate and 3832 parts of ion exchanged water were mixed, and the mixture was dissolved for one hour at 90° C. to obtain a homogeneous polyvinyl alcohol solution for the protective layer.

Preparation of Pigment Dispersion Solution for Protective Layer

With 8 parts of barium sulfate (trade name: BF-2 IF, the content of barium sulfate of 93% or more, manufactured by Sakai Chemical Industry Co., Ltd.), 0.2 part of an anionic specific polycarboxylic acid type polymer active agent (trade name: POISE 532A, (40% aqueous solution), manufactured by KAO Corporation) and 11.8 parts of ion exchanged water were mixed, the mixture was dispersed by a dynomill, and a dispersion solution of barium sulfate was prepared. As a result of the measurement of particle diameter (measured by LA-910: manufactured by Horiba Ltd. to be carried out), the dispersion solution had 0.15 $\mu$m or less in a median diameter.

8.1 Parts of colloidal silica (trade name: SNOWTEX O, (20% aqueous dispersion solution), manufactured by Nissan Chemical Co., Ltd.) per 45.6 parts of the above-mentioned dispersion solution of barium sulfate was added to prepare a pigment dispersion solution for the protective layer.

Preparation of Matting Agent Dispersion Solution for Protective Layer

With 220 parts of wheat starch (trade name: Wheat Starch S, manufactured by Shinshin Food Industries Co., Ltd.), 3.81 parts of an aqueous dispersion product of 1-2-benzisothiazolin-3-on (trade name: PROXEL B.D, manufactured by ICI Co., Ltd.) and 1976.19 parts of ion exchanged water were mixed, and the mixture was homogeneously dispersed to obtain a matting agent dispersion solution for the protective layer.

Preparation of Coating Blend Solution for Protective Layer

With 1000 parts of the above-mentioned polyvinyl alcohol solution for the protective layer, 40 parts of the above-mentioned compound (K) (trade name: MEGAFAC F-120, 5% aqueous solution, manufactured by Dainippon Ink and Chemicals Incorporated), 50 parts of sodium (4-nonylphenoxytrioxyethylene)butylsulfonate (2.0% aqueous solution, manufactured by Sankyo Chemical Co., Ltd.), 49.87 parts of the above-mentioned pigment dispersion solution for the protective layer, 16.65 parts of the above-mentioned matting agent dispersion solution for the protective layer, and 48.7 parts of a zinc stearate phosphate dispersion solution (trade name: HIDORIN F115, 20.5% aqueous solution, manufactured by Chukyo Oil & Fat Co., Ltd.) were homogeneously mixed to obtain a coating blend solution for the protective layer.

(7) Support with Undercoat Layer

Preparation of Support with Undercoat Layer

40 Parts of enzyme decomposed gelatin (average molecular weight: 1000, viscosity by PAGI method: 1.5 mPa·s (15 mP), jelly strength by PAGI method: 20 g) was added to 60 parts of ion exchanged water, and the mixture was dissolved at 40° C. by stirring to prepare a gelatin aqueous solution for the undercoat layer.

Separately, after 8 parts of a water swelling synthetic mica (aspect ratio: 1000, trade name: SOMASIF ME100, manufactured by Co-op Chemical Co., Ltd.) and 92 parts of water were mixed, the mixture was wet dispersed by a visco mill to obtain a mica dispersion solution having an average particle diameter of 2.0 $\mu$m. Water was added to the mica dispersion solution so that the concentration of mica becomes 5%, and the mixture was homogeneously mixed to prepare a desired mica dispersion solution.

To 100 parts of the above-mentioned 40% gelatin aqueous solution at 40° C., 120 parts of water and 556 parts of methanol were added, the mixture was adequately mixed by stirring, then 208 parts of the above-mentioned 5% mica dispersion solution was added, the mixture was adequately mixed by stirring, and 9.8 parts of a 1.66% polyethyleneoxide-base surfactant was added. Further, the temperature of the solution was kept at 35 to 40° C., 7.3 parts of the gelatin curing agent of an epoxy compound was added to prepare a coating solution (5.7%) for the undercoat layer, and a coating solution for the undercoat layer was obtained.

Preparation of Support with Undercoat Layer

A wood pulp comprising 50 parts of LBPS and 50 parts of LBPK was knocked to pieces of Canadian freeness of 300 ml by a disc refiner, 0.5 part of epoxynized behenic acid amide, 1.0 part of an anion polyacryl amide, 1.0 part of aluminum sulfate, 0.1 part of a polyamidepolyamineepichlorohydrine and 0.5 part of a cation polyacryl amide were added at an absolutely dry mass ratio against the pulp, a base paper having a basis weight of 114 g/m$^2$ is made a fourdrinier paper machine, and the thickness was adjusted at 100 $\mu$m by a calendering treatment.

Then, after carrying out corona discharge treatment on both sides of the base paper, a polyethylene was coated so as to be a resin thickness of 36 $\mu$m using a melt extruder, and a resin layer comprising a mat plane was formed (the face is called as a rear face). Then, a polyethylene which contains 10% of anatase type titanium dioxide and trace amount of navy blue was coated on the counter side of the face on which the above-mentioned resin layer was formed, using a melt extrude, so as to be a resin layer thickness of 50 $\mu$m, and the resin layer comprising a glazing face was formed (the face is called as a front face). After carrying out corona discharge treatment on the face coated with a polyethylene resin at the rear face, aluminum oxide (trade name: ALUMINA SOL 100, manufactured by Nissan Chemical Industries Co. Ltd.)/silicone dioxide (trade name: SNOWTEX O, manufactured by Nissan Chemical Industries Co., Ltd.)=½ (mass ratio) were dispersed in water as an antistatic agent and coated by 0.2 g/m$^2$ at a mass after drying. Then, after carrying out corona discharge treatment on the front face coated with the polyethylene resin, the above-mentioned undercoat solution was coated so that the coating amount of mica becomes 0.26 g/m$^2$, and a support with the undercoat layer was obtained.

(8) Coating of Coating Solution for Respective Heat-Sensitive Recording Layers

On the above-mentioned support with the undercoat layer, 7 layers of the above-mentioned coating solution (c) for the yellow heat-sensitive recording layer, the above-mentioned coating solution for the intermediate layer, the above-mentioned coating solution (b) for the magenta heat-sensitive recording layer, the above-mentioned coating solution for the intermediate layer, the above-mentioned coating solution (a) for the cyan heat-sensitive recording layer, the above-mentioned coating solution for the light transmittance adjusting layer and the above-mentioned coating solution for the protective layer were continuously coated in this order from the lower side at the same time, and the layers were dried at conditions of 30° C. and a humidity of 30%, and 40° C. and a humidity of 30% to obtain the multicolor heat-sensitive recording material of Example 1.

At this time, the coating amount of the above-mentioned coating solution (a) for the heat-sensitive recording layer was coated so that the coating amount of the diazo compound (A) contained in the solution is 0.078 g/m$^2$ by a solid coating amount, similarly, the coating amount of the above-mentioned coating solution (b) for the heat-sensitive recording layer was coated so that the coating amount of the diazo compound (D) contained in the solution is 0.206 g/m$^2$ by a solid coating amount, and similarly, the coating amount of the above-mentioned coating solution (c) for the heat-sensitive recording layer was coated so that the coating amount of the electron-donating dye (H) contained in the solution is 0.355 g/m$^2$ by a solid coating amount.

Further, with respect to the above-mentioned coating solution for the intermediate layer, coating was carried out so that the solid coating amount is 2.39 g/m$^2$ between (a) and (b), and 3.34 g/m$^2$ between (b) and (c). With respect to the above-mentioned coating solution for the light transmittance adjusting layer, coating was carried out so that the solid coating amount is 2.35 g/m$^2$ and with respect to the protective layer, coating was carried out so that the solid coating amount is 1.39 g/m$^2$.

With respect to the multicolor heat-sensitive recording material obtained, a light exposure test was carried out for 48 hours and 96 hours by continuous irradiation under an artificial solar light source having a output power of 0.9 w/cm$^2$ at a wave length of 420 nm, using a weather meter (Ci65 type: manufactured by Atlas Co.). The yellow concentration of the images obtained was measured by X-rite model 310 (manufactured by X-rite Incorporated). The result is shown in Table 1.

Example 2

The multicolor heat-sensitive recording material of Example 2 was prepared in like manner as in Example 1, except that preparation was carried out using a silica-modified polyvinyl alcohol (trade name: R-2105, manufactured by Kuraray Co., Ltd., a saponification degree of 98%) having oxygen permeability of 0.70 in place of a silica-modified polyvinyl alcohol (trade name: R-1130, manufactured by Kuraray Co., Ltd., a saponification degree of 98%) which was used in the preparation of the above-mentioned microcapsule solution of the precursor of ultraviolet absorbent in Example 1, and the similar evaluations were carried out. The result is shown in Table 1.

Example 3

The multicolor heat-sensitive recording material of Example 3 was prepared in like manner as in Example 1, except that preparation was carried out using a polyvinyl alcohol (trade name: PVA117, manufactured by Kuraray Co., Ltd., a saponification degree of 98.5%) having oxygen permeability of 0.70 in place of a silica-modified polyvinyl alcohol (trade name: R-1130, manufactured by Kuraray Co., Ltd., a saponification degree of 98%) which was used in the preparation of the above-mentioned microcapsule solution of the precursor of ultraviolet absorbent in Example 1, and the similar evaluations were carried out. The result is shown in Table 1.

Example 4

The multicolor heat-sensitive recording material of Example 4 was prepared in like manner as in Example 1, except that preparation was carried out using a terminal alkyl-modified polyvinyl alcohol (trade name: MP103, manufactured by Kuraray Co., Ltd., a saponification degree of 98%) having oxygen permeability of 0.67 in place of a silica-modified polyvinyl alcohol (trade name: R-1130, manufactured by Kuraray Co., Ltd., a saponification degree of 98%) which was used in the preparation of the above-mentioned microcapsule solution of the precursor of ultraviolet absorbent in Example 1, and the similar evaluations were carried out. The result is shown in Table 1.

Example 5

The multicolor heat-sensitive recording material of Example 5 was prepared in like manner as in Example 1, except that the content of the silica-modified polyvinyl alcohol in Example 1 was changed from 30% of the light transmittance adjusting layer to 15%, and the similar evaluations were carried out. The result is shown in Table 1.

Example 6

The multicolor heat-sensitive recording material of Example 6 was prepared in like manner as in Example 1, except that the content of the silica-modified polyvinyl alcohol in Example 1 was changed from 30% of the light transmittance adjusting layer to 5%, and the similar evaluations were carried out. The result is shown in Table 1.

Comparative Example 1

The multicolor heat-sensitive recording material of Comparative Example 1 was prepared in like manner as in Example 1, except that a silica-modified polyvinyl alcohol (trade name: R-1130, manufactured by Kuraray Co., Ltd., a saponification degree of 98%) which was used in the preparation of the above-mentioned microcapsule solution of the precursor of ultraviolet absorbent in Example 1 was not used, and the similar evaluations were carried out. The oxygen permeability of the PVA aqueous solution for microcapsule solution of the precursor of ultraviolet absorbent was 0.84. The result is shown in Table 1.

TABLE 1

|  | Fresh | Irradiation for 48 hours | Irradiation for 96 hours |
| --- | --- | --- | --- |
| Example 1 | 0.043 | 0.080 | 0.110 |
| Example 2 | 0.040 | 0.087 | 0.127 |
| Example 3 | 0.046 | 0.087 | 0.124 |
| Example 4 | 0.045 | 0.088 | 0.140 |
| Example 5 | 0.046 | 0.093 | 0.125 |
| Example 6 | 0.045 | 0.099 | 0.142 |

TABLE 1-continued

| | Fresh | Irradiation for 48 hours | Irradiation for 96 hours |
|---|---|---|---|
| Comparative Example 1 | 0.045 | 0.110 | 0.161 |

As cleared from Table 1, the increase of coloring concentration of a texture by light irradiation becomes high in accordance with the lapse of time in case of the heat-sensitive recording material of Comparative Example 1, but to the contrary, in case of the heat-sensitive recording materials of Examples 1 to 4, the increase of coloring concentration by light irradiation is low in comparison with Comparative Example 1, therefore the coloring of the texture by exposure to light could be effectively suppressed.

According to the heat-sensitive recording material of the present invention, it is remarkably superior in light resistance and can effectively suppress the coloring of the texture by exposure to light.

What is claimed is:

1. A heat-sensitive recording material comprising a support having disposed thereon at least a heat-sensitive recording layer, a light transmittance adjusting layer and a heat resistant protective layer,
    wherein the light transmittance adjusting layer includes a polyvinyl alcohol having a saponification rate of 90 mol % or more, and
    wherein oxygen permeability of the light transmittance adjusting layer is 0.8 or less.

2. The heat-sensitive recording material according to claim 1, wherein the light transmittance adjusting layer includes at least one selected from the group consisting of a polyvinyl alcohol, a modified polyvinyl alcohol, a styrene-maleic anhydride copolymer, a butadiene-maleic anhydride copolymer, an ethylene-maleic anhydride copolymer, an isobutylene-maleic anhydride copolymer, a polyacryl amide, a poly(styrene sulfonic acid), a polyvinyl pyrrolidone, an ethylene-acrylic acid copolymer, gelatin, a carboxymethyl cellulose, a styrene-butadiene copolymer latex emulsion, a carboxy modified styrene-butadiene copolymer latex emulsion, an acrylonitrile-butadiene copolymer latex emulsion, a mica and pigments.

3. The heat-sensitive recording material according to claim 1, wherein a content of the polyvinyl alcohol having a saponification rate of 90 mol % or more is 10% by mass or more of the light transmittance adjusting layer.

4. The heat-sensitive recording material according to claim 1, wherein the light transmittance adjusting layer includes a polyvinyl alcohol represented by the following general formula (1):

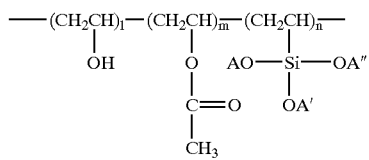

General formula (1)

wherein l, m and n represent a polymerization molar ratio, l represents a real number from 90 to 99, m represents a real number from 0 to 10 and n represents a real number from 0 to 10 and A, A' and A" each represent a $C_1$ to $C_8$ alkyl group.

5. The heat-sensitive recording material according to claim 1, wherein the light transmittance adjusting layer includes a component that functions as a precursor of an ultraviolet absorbent.

6. The heat-sensitive recording material according to claim 5, wherein the component that functions as a precursor of an ultraviolet absorbent is included in the light transmittance adjusting layer by a method selected from the group consisting of solid dispersion, emulsification dispersion, polymer dispersion, latex dispersion and microencapsulation.

7. The heat-sensitive recording material according to claim 5, wherein the component that functions as a precursor of an ultraviolet absorbent comprises at least one compound selected from compounds represented by one of the following general formulae (2), (3), (4) and (5):

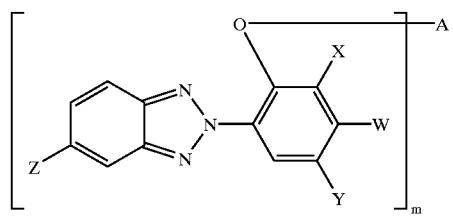

General formula (2)

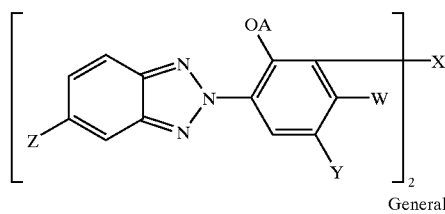

General formula (3)

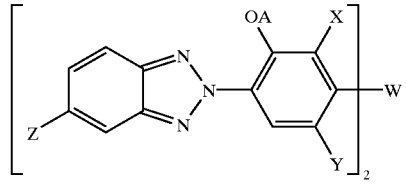

General formula (4)

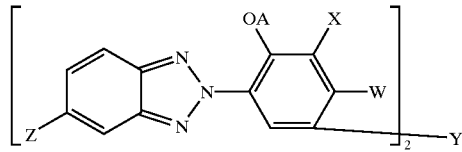

General formula (5)

wherein:
in the general formulae (2) to (5), m represents 1 or 2;
in the general formula (2) and the general formulae (3) to (5) when m=1, A represents —$SO_2$—R, —CO—R, —$CO_2$—R, —CONH—R, —POR$^1$R$^2$, —$CH_2$R$^3$ or —SiR$^4$R$^5$R$^6$;
in the general formula (2), when m=2, A represents —$SO_2$—R$^7$—$SO_2$—, —CO—, —COCO—, —COR$^7$CO—, —$SO_2$— or —SO—;
in the general formulae (2), (4) and (5), X represents a hydrogen atom, an alkyl group, an alkoxy group, an aryl group or a halogen atom;
in the general formula (3), X represents an alkylene group, —COR$^7$CO— or —COR$^7$CO$_2$—;
in the general formulae (2), (3) and (5), W represents a hydrogen atom, an alkyl group, an alkoxy group, an aryl group or a halogen atom;

in the general formula (4), W represents —COR$^7$CO— or —COR$^7$CO$_2$—;

in the general formulae (2), (3) and (4), Y represents a hydrogen atom, an alkyl group, an alkoxy group, an aryl group or a halogen atom;

in the general formula (5), Y represents —COR$^7$O—O or —OCOR$^7$CO$_2$—, —CH$_2$CH$_2$CO$_2$R$^7$OCOCH$_2$CH$_2$—, —CH$_2$CH$_2$OCOR$^7$CO$_2$CH$_2$CH$_2$— or —CH$_2$CH$_2$CON(R$^8$)R$^7$N(R$^8$)COCH$_2$CH$_2$—;

Z represents a hydrogen atom, a halogen atom, an alkyl group or an alkoxy group;

R represents an alkyl group or an aryl group;

R$^1$ and R$^2$ each represent an alkoxy group, an aryloxy group, an alkyl group or an aryl group;

R$^3$ represents a phenyl group which is substituted with at least one of a nitro group or a methoxy group;

R$^4$, R$^5$ and R$^6$ each represent an alkyl group or an aryl group;

R$^7$ represents an alkylene group or an arylene group; and

R$^8$ represents a hydrogen atom or an alkyl group.

8. The heat-sensitive recording material according to claim 1, wherein the heat-sensitive recording layer comprises at least one layer including, as main components, a diazonium salt compound, a diazo-base coloring agent containing a coupler which undergoes a coupling reaction with the diazonium salt compound, and a binder.

9. The heat-sensitive recording material according to claim 1, wherein the heat-sensitive recording layer comprises a compound represented by the following general formula (A) in an amount of 0.05 g/m$^2$ or more R—SO$_3$M         General formula (A)

wherein, in the general formula (A), R represents an alkyl group, an aryl group, an alkoxy group, an aryloxy group, a polyoxyethylenearyl group, or a polyoxyethylenealkyl group, and M represents an alkali metal.

10. The heat-sensitive recording material according to claim 9, wherein the compound represented by general formula (A) is sodium dodecylbenzenesulfonate.

* * * * *